United States Patent
Li et al.

(10) Patent No.: US 12,263,661 B2
(45) Date of Patent: Apr. 1, 2025

(54) FILM APPLICATOR

(71) Applicant: Dongguan Ruiying Electronics Co., LTD., Dongguan (CN)

(72) Inventors: Yibo Li, Shenzhen (CN); Wei Wei, Shenzhen (CN)

(73) Assignee: Dongguan Ruiying Electronics Co., LTD., Dongguan (CN)

( * ) Notice: Subject to any disclaimer, the term of this patent is extended or adjusted under 35 U.S.C. 154(b) by 0 days.

(21) Appl. No.: 18/632,338

(22) Filed: Apr. 11, 2024

(65) Prior Publication Data
US 2024/0278548 A1    Aug. 22, 2024

Related U.S. Application Data

(63) Continuation of application No. PCT/CN2023/132149, filed on Nov. 16, 2023.

(30) Foreign Application Priority Data

Feb. 21, 2023  (CN) .......................... 202320345552.0
Oct. 26, 2023  (CN) .......................... 202322900167.0

(51) Int. Cl.
*B32B 37/00*  (2006.01)
*B32B 37/26*  (2006.01)

(52) U.S. Cl.
CPC .......... *B32B 37/0046* (2013.01); *B32B 37/26* (2013.01); *B32B 2457/20* (2013.01)

(58) Field of Classification Search
CPC .. B32B 37/0046; B32B 37/26; B32B 2457/20
See application file for complete search history.

(56) References Cited

U.S. PATENT DOCUMENTS

| 2015/0041069 | A1* | 2/2015 | Wadsworth | B29C 63/0004 |
| | | | | 156/247 |
| 2015/0277502 | A1* | 10/2015 | Witham | H04B 1/3888 |
| | | | | 269/287 |
| 2020/0094467 | A1* | 3/2020 | Cho | B29C 63/0004 |
| 2023/0024617 | A1 | 1/2023 | Yu | |

FOREIGN PATENT DOCUMENTS

| CN | 206202783 U | 5/2017 |
| CN | 207482269 U | 6/2018 |
| CN | 208410750 U | 1/2019 |
| CN | 109952188 A | 6/2019 |
| CN | 209794552 U | 12/2019 |
| CN | 209956302 U | 1/2020 |

(Continued)

*Primary Examiner* — Daniel McNally
(74) *Attorney, Agent, or Firm* — Andrew C. Cheng

(57) ABSTRACT

A film applicator includes a frame including a positioning cavity for positioning an electronic device therein; a positioning film attached to the frame; and a protective film unit adhered to a side of the positioning film facing the electronic device. The protective film unit includes a protective film adhered to the positioning film; a release film adhered to a side of the protective film opposite to the positioning film; and a pull film fixed to one end of the release film such that the release film can be detached from the protective film by pulling the pull film to allow the protective film to be attached to the electronic device.

20 Claims, 20 Drawing Sheets

(56) References Cited

FOREIGN PATENT DOCUMENTS

| | | |
|---|---|---|
| CN | 210792077 U | 6/2020 |
| CN | 210851321 U | 6/2020 |
| CN | 111392245 A | 7/2020 |
| CN | 211127882 U | 7/2020 |
| CN | 212124187 U | 12/2020 |
| CN | 212150059 U | 12/2020 |
| CN | 212684709 U | 3/2021 |
| CN | 213006557 U | 4/2021 |
| CN | 112793145 A | 5/2021 |
| CN | 213919588 U | 8/2021 |
| CN | 214649289 U | 11/2021 |
| CN | 214983189 U | 12/2021 |
| CN | 215098531 U | 12/2021 |
| CN | 215320627 U | 12/2021 |
| CN | 215972321 U | 3/2022 |
| CN | 217673461 U | 10/2022 |
| CN | 217968385 U | 12/2022 |
| CN | 218113112 U | 12/2022 |
| CN | 218615424 U | 3/2023 |
| CN | 218660457 U | 3/2023 |
| CN | 218749319 U | 3/2023 |
| CN | 219277896 U | 6/2023 |
| WO | 2020037766 A1 | 2/2020 |

\* cited by examiner

FILM APPLICATOR

CROSS REFERENCE TO RELATED APPLICATIONS

This application is a continuation of International (PCT) Patent Application No. PCT/CN2023/132149, filed on Nov. 16, 2023, which claims priority of China Patent Application No. 202320345552.0, filed on Feb. 21, 2023, China Patent Application No. 202322900167.0, filed on Oct. 26, 2023. The contents of the above-identified applications are incorporated herein by reference.

TECHNICAL FIELD

The present disclosure relates to accessories of electronic devices, and more particularly to a film applicator for mounting a protective film to a screen of an electronic device.

BACKGROUND

Electronic device, such as mobile phones, have been widely used. These electronic devices generally have large touchscreens. In order to protect these touchscreens from being damaged, protective films are usually attached to the screens. In order to facilitate mounting the protective films to the screens, film applicators have been developed.

SUMMARY OF THE DISCLOSURE

The present disclosure provides a film applicator which includes a positioning cavity for positioning an electronic device therein; a positioning film attached to the frame; and a protective film unit adhered to a side of the positioning film facing the electronic device. The protective film unit includes a protective film adhered to the positioning film; a release film adhered to a side of the protective film opposite to the positioning film; and a pull film fixed to one end of the release film such that the release film can be detached from the protective film by pulling the pull film to allow the protective film to be attached to the electronic device.

In some embodiments, the frame further comprises an operation window to expose the positioning film.

In some embodiments, the positioning cavity comprises a first accommodation chamber for accommodating the positioning film and the protective film unit, and a second accommodation chamber for accommodating the electronic device; and the first accommodation chamber is located between the second accommodation chamber and the operation window, and is in communication with the second accommodation chamber and the operation window.

In some embodiments, the frame comprises a first positioning portion located at a side of the positioning cavity; the positioning film comprises a second positioning portion; and the positioning film is fixedly or detachably attached to the frame via the first positioning portion cooperating with the second positioning portion.

In some embodiments, the first positioning portion comprises a first positioning protrusion having a barb or hook formed at a side thereof facing the positioning cavity; the second positioning portion comprises a first positioning hole; and the first positioning protrusion extends through the first positioning hole with an edge of the first positioning hole being blocked by the barb or hook to prevent the positioning film disengaging from the frame.

In some embodiments, the positioning film further comprises a body for supporting the protective film; the second positioning portion extends from the body and beyond the protective film; the second positioning portion comprises multiple positioning holes; and the first positioning portion comprises multiple positioning protrusions engaged in the positioning holes respectively; and at least one of the positioning holes offsets from another of the positioning holes in a longitudinal direction of the frame and a transverse direction of the frame.

In some embodiments, the frame comprises a bottom wall facing the positioning film and a sidewall surrounding the positioning cavity; the sidewall defines a through slot located at an opposite side of the positioning cavity; the pull film comprising a free end; and the free end of the pull film extends out of the frame via the through slot or the pull film is changeable between a use state where the free end of the pull film extends out of the frame via the through slot and a storage state where the free end of the pull film is located within the frame.

In some embodiments, the free end of the pull film defines a through hole, the sidewall comprises a protrusion projecting into the through slot for engaging in the through hole of the pull film to maintain the free end of the pull film extending out of the frame.

In some embodiments, the frame further comprises an adjusting member disposed between the bottom wall and the positioning film and configured for urging the positioning film and the protective film unit toward the electronic device; the adjusting member protrudes from one of the bottom wall and the positioning film toward the other of the bottom wall and the positioning film; the frame defines a longitudinal direction, the first positioning portion and the through slot are respectively arranged at opposite ends of the frame in the longitudinal direction; and a distance between the adjusting member and an end of the protective film close to the through slot in the longitudinal direction is equal to or less than that between the adjusting member and an opposite end of the protective film close to the first positioning portion.

In some embodiments, the sidewall comprises a recessed portion sunken outwardly from an inner circumferential surface thereof facing the positioning cavity; or the sidewall comprises a flexible press button facing the positioning cavity.

In some embodiments, the frame comprises a substrate and a cover pivotably connected to the substrate, the positioning cavity is defined in the substrate, and the positioning film is connected to the substrate or the cover.

In some embodiments, the cover defines an operation window to expose the positioning film out of the cover.

In some embodiments, the frame further comprises a through slot which is located at an end of the frame opposite to a pivot joint between the cover and the substrate.

In some embodiments, an adhesive member is disposed between the first positioning portion and the second positioning portion to thereby adhere the positioning film to the frame.

In some embodiments, a retaining member is provided on a sidewall of the positioning cavity and faces the positioning cavity.

In some embodiments, the retaining member comprises a deformable boss protruding from the sidewall of the accommodation chamber.

Alternatively, the retaining member comprises an elastic structure fixedly or detachably attached to the sidewall of the positioning cavity.

In some embodiments, the sidewall comprises a weight reduce structure which comprises any one or more of cutout, notch, opening, aperture, hole and avoid.

In some embodiments, the release film comprises a body adhered to the protective film and a connection part extending from one end of the body, the pull film comprises a connection end connected to the connection part, and an overlapped area between the connection end and the connection part has a width in a range of 3 mm to 20 mm.

In some embodiments, the pull film comprises a free end extending beyond the protective film; and the free end comprises a through hole or a pull indication sign.

In some embodiments, an adhesive layer is disposed between the protective film and the release film, and an adhesive force formed between the adhesive layer and the protective film is greater than another adhesive force formed between the adhesive layer and the release film.

BRIEF DESCRIPTION OF THE DRAWINGS

The present disclosure will be described in more detail with reference to the accompany drawings and the embodiments, wherein in the drawings.

PREFERRED EMBODIMENTS

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

In addition, the terms "first" and "second" are only for the purpose of description and should not be regarded as indicating or implying relative importance or implying the quantity of technical features indicated. Therefore, the features limited to "first" and "second" can explicitly or implicitly include one or more features. In the description of this application, "multiple" means two or more, unless otherwise specified.

Use of "including" and "comprising" and variations thereof as used herein is meant to encompass the items listed thereafter and equivalents thereof as well as additional items. Unless specified or limited otherwise, the terms "mounted," "attached", "secured", "connected," "supported," and "fixed" and variations thereof are used broadly, encompass both direct and indirect mountings, attachments, securing, connections, supports, and fixings, and encompass both detachably or un-detachably mountings, attachments, securing, connections, supports, and fixings.

Also, the functionality described herein as being performed by one component may be performed by multiple components in a distributed manner. Likewise, functionality performed by multiple components may be performed by a single component. Similarly, a component described as performing particular functionality may also perform additional functionality not described herein. For example, a device or structure that is "configured" in a certain way is configured in at least that way but may also be configured in ways that are not listed.

The embodiment(s) described below and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

Figure 22:
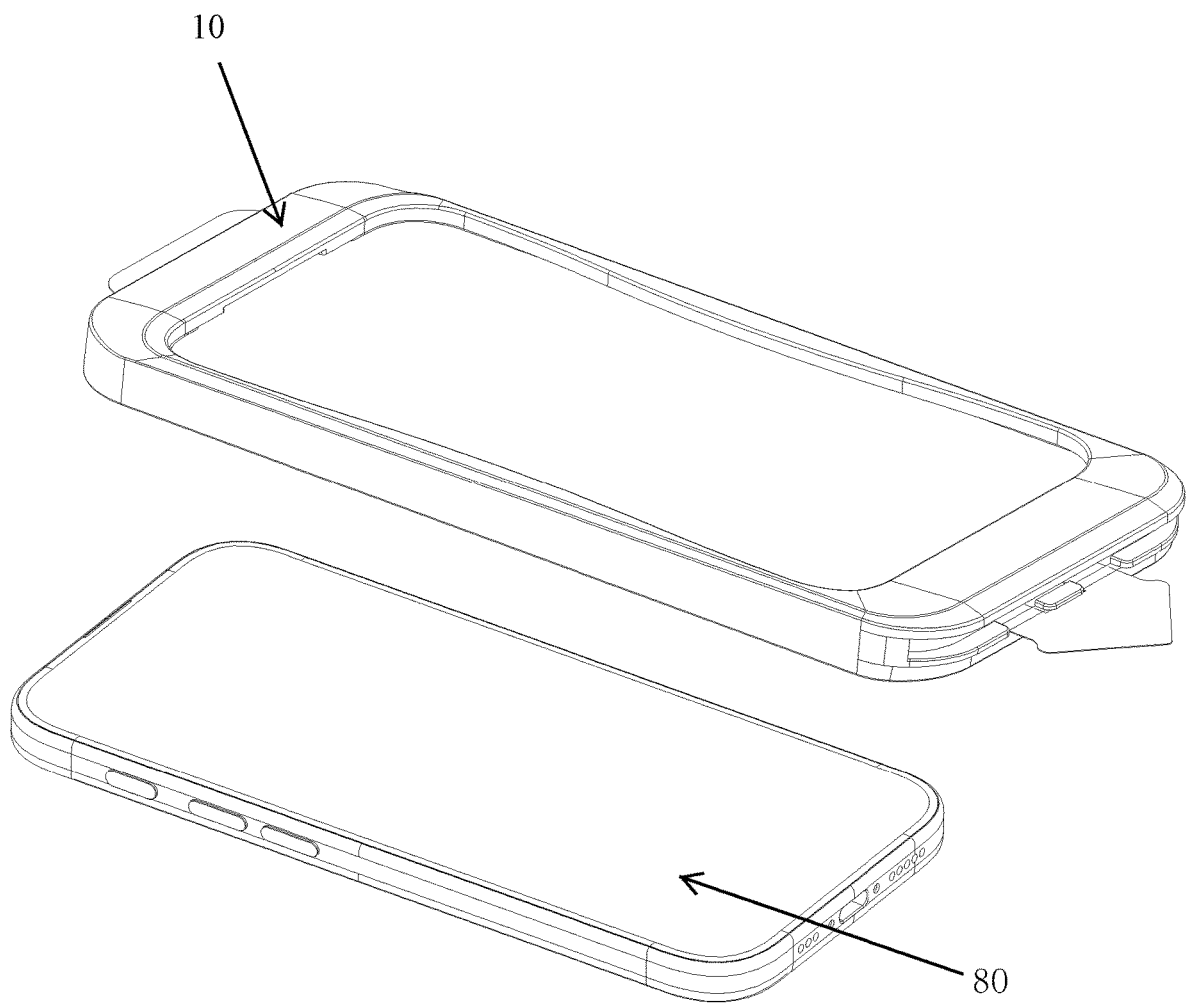
FIG. 22 illustrates a film applicator in accordance with one embodiment of the present invention and an electronic device which has a screen.

The present invention provides a film applicator 10 configured to mount a protective film to screens of electronic devices 80 (see FIG. 22), such as mobile phones, tablet computing device, media players, etc. In the illustrated embodiments, mobile phones are taken for an example.

Figure 5:
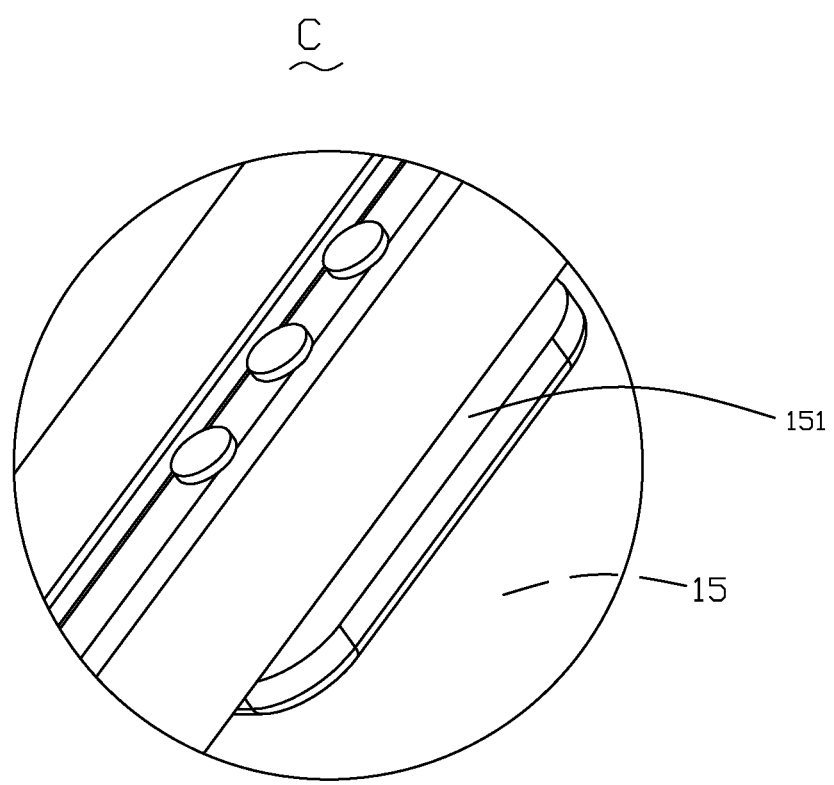
FIG. 5 is an enlarged view of circled portion C of FIG. 2.
Figure 6:
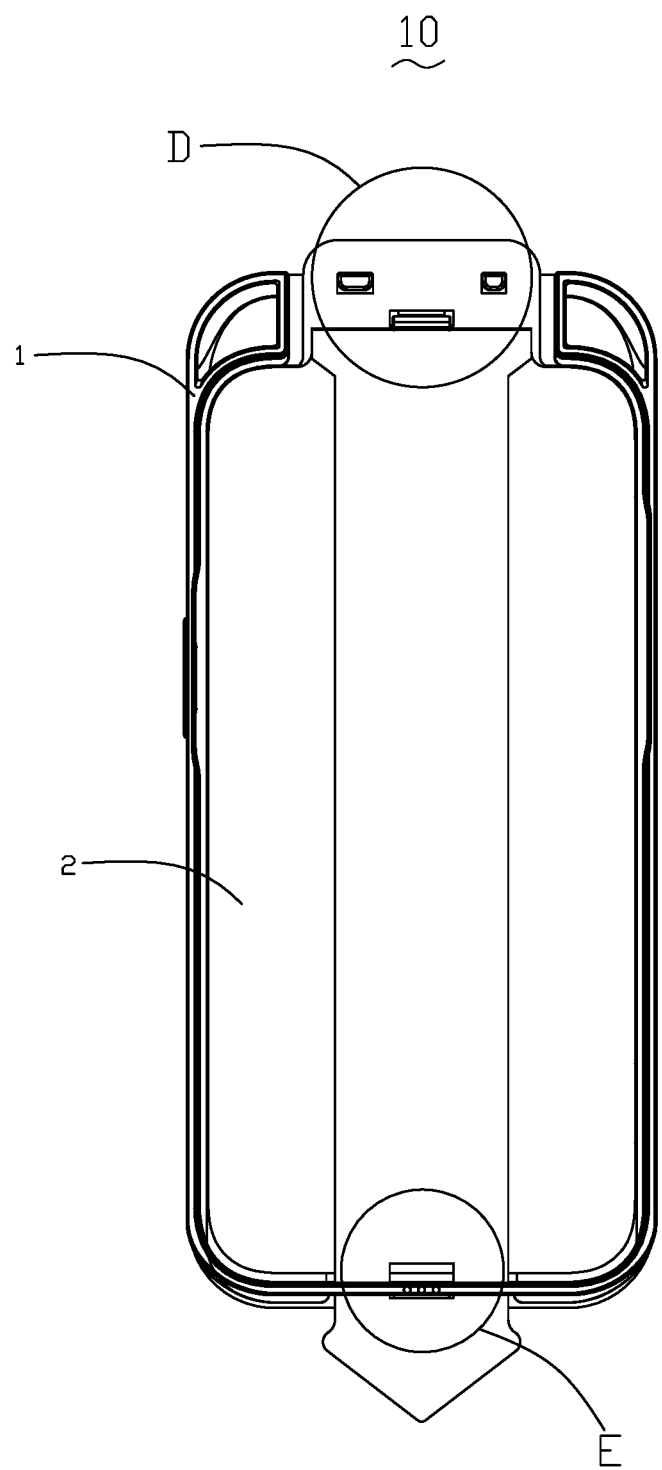
FIG. 6 is a top plan view of the film applicator of FIG. 1.
Figure 7:
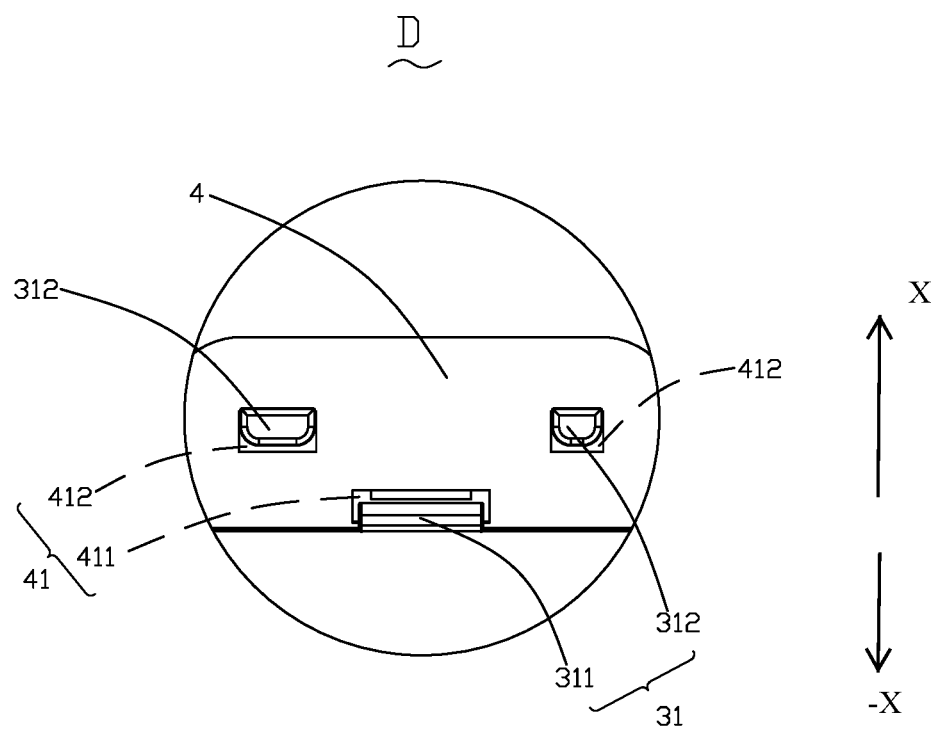
FIG. 7 is an enlarged view of circled portion D of FIG. 6.

Referring to FIGS. 1-8, a film applicator 10 in accordance with an embodiment of the present invention comprises a positioning assembly 1 and a protective film unit 2 (see FIG. 6).

The positioning assembly 1 comprises a frame 11 and a positioning film 12. The frame 11 comprises a positioning cavity 111 configured to position the mobile phone therein. The positioning film 12 is positioned in the positioning cavity 111 or located at one side of the positioning cavity 111. The positioning film 12 is configured to position the protective film unit 2 relative to the frame 11. The protective film unit 2 is detachably secured to the positioning film 12 to thereby be positioned to the frame 11. Optionally, the protective film unit 2 is adhered to the positioning film 12.

The protective film unit 2 comprises a protective film 21, a releasable release film 22 and a pull film 23. The release film 22 is mounted on one side of the protective film 21. One end of the pull film 23 is connected to one end of the release film 22. The other side of the protective film 23 opposite to the release film 22 is adhered to the positioning film 12.

The protective film unit 2 is positioned in the positioning cavity 111 by adhering means. Specifically, the protective film unit 2 is positioned in the positioning cavity 111 by the positioning film 12 to which the protective film unit 2 is adhered. When there is a need to adhere the protective film to a screen of an electronic device 80, the screen of the electronic device 80 is only needed to be aligned with and placed into the positioning cavity 111, that is, the frame 11 and the positioning film 12 are sleeved on the screen of the electronic device 80, which results in the protective film unit 2 being aligned with the screen of the electronic device 80. It is convenient for the user to operate, and the error rate of misalignment made in the process of operation is reduced. One side of the protective film 21 of the protective film unit 2 is adhered to and connected with the positioning film 12, the release film 22 is connected to the other side of the protective film 21, and one end of the pull film 23 is connected with the end of the release film 22. The user pulls the pull film 23 to drive the release film 22 to separate from the protective film 21, so that the protective film 21 is attached to the screen of the electronic device. By pressing the side of the positioning film 12 opposite from the protective film 21 toward the screen of the electronic device, the protective film 21 is firmly attached on the screen of the electronic device and separated from the positioning film 12. During the whole process of the release film 22 moving away from the protective film 21, since the positioning assembly 1 is sleeved on the screen of the electronic device, the screen of the electronic device and the protective film unit 2 are not exposed to the external environment, dust is not easy to enter the gap formed between the protective film 21 and the screen of the electronic device. The release film 22 will produce static electricity when it is separated from the protective film 21, and the static electricity can attract dust, so as to take away the dust, further reduce the dust accumulated between the protective film 21 and the screen of the electronic device, so as to improve the success rate of pasting the protective film on the screen of the electronic device. The operation of attaching the protective film to the screen of the electronic device is simple and convenient. It is easy for the user to operate. The protective film unit 2 and the electronic device have been positioned and fixed by the positioning assembly 1, reducing the occurrence of the protective film offset from the screen of the electronic device, at the same time, reducing the chance of dust entering the gap between the protective film 21 and the screen of the electronic device, simplifying the user's operation, and improving the accuracy of operation.

Figure 2:
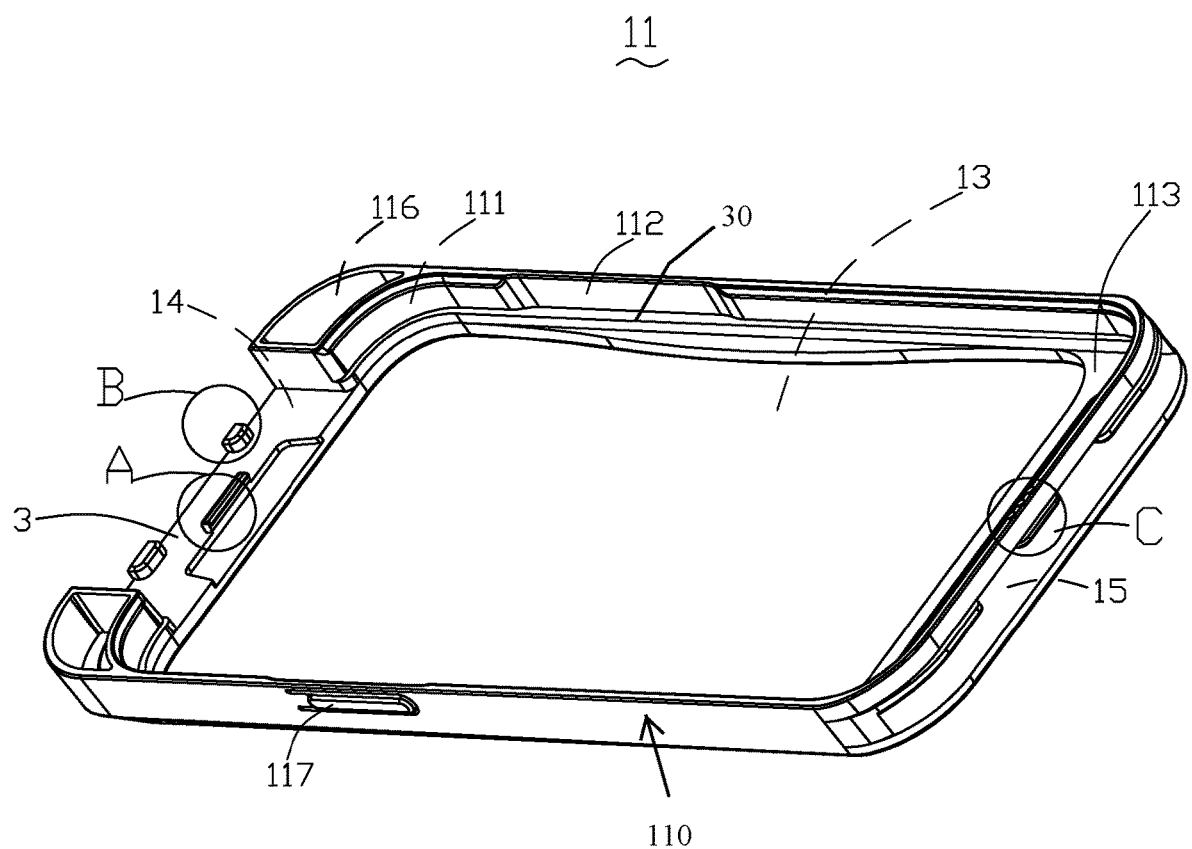
FIG. 2 is a perspective view of the frame of the film applicator of FIG. 1.
Figure 3:
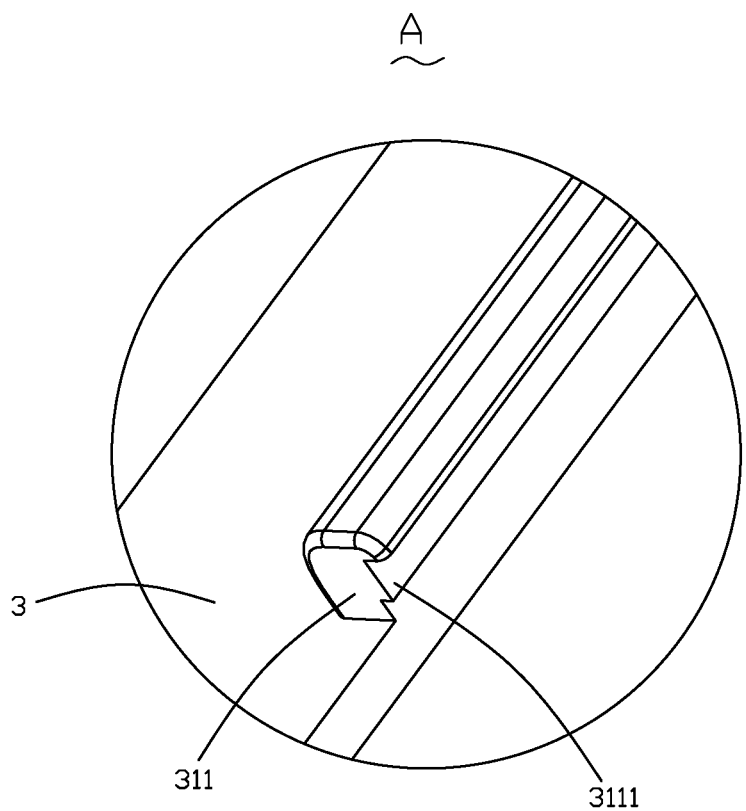
FIG. 3 is an enlarged view of circled portion A of FIG. 2.
Figure 4:
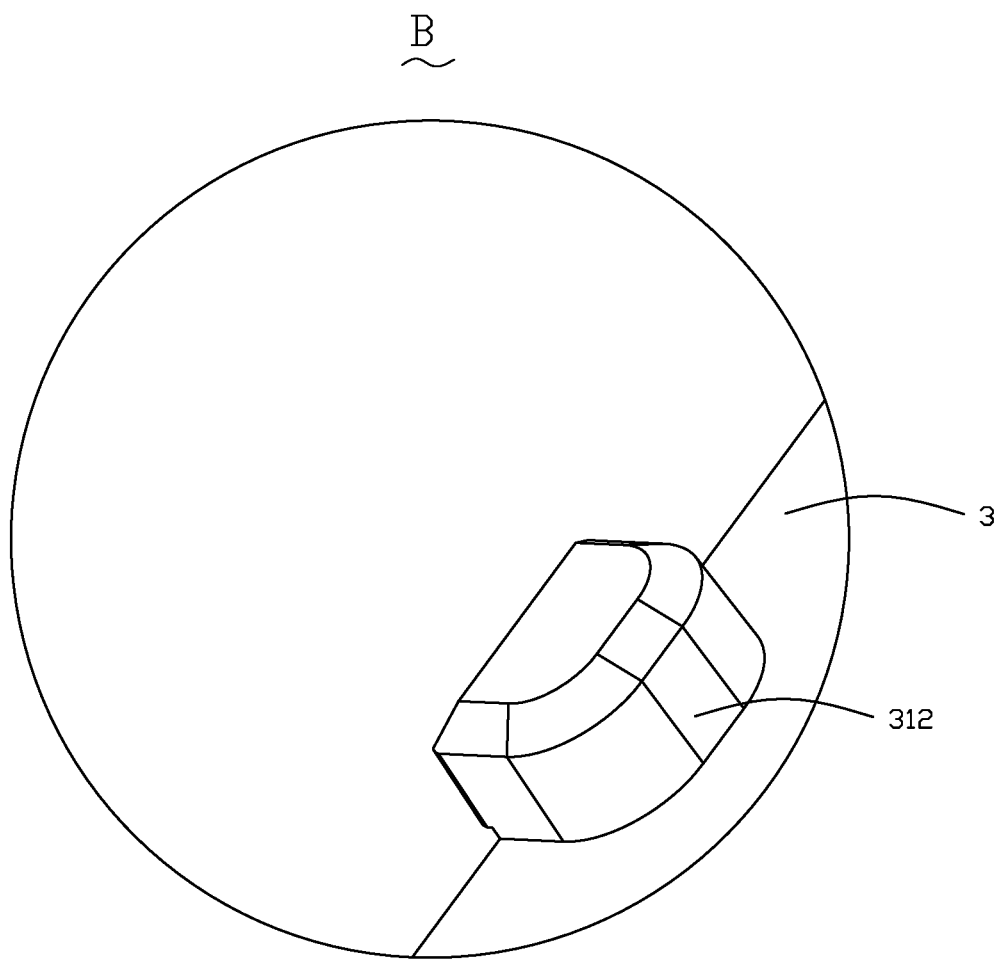
FIG. 4 is an enlarged view of circled portion B of FIG. 2.

Referring to FIG. 2, the frame 11 comprises a sidewall 110 and a bottom wall 113. The sidewall 110 extends from a periphery of the bottom wall 113, and the sidewall 110 and the bottom wall 113 cooperatively form the positioning cavity 111 so that the protective film unit 2 can be positioned in the positioning cavity 111 and be prevented from shaking. When the electronic device is placed and positioned in the positioning cavity 111, the protective film unit 2 can be aligned with the screen of the electronic device accurately.

Alternatively, the frame 11 comprises a sidewall 110 which defines and surrounds the positioning cavity 111 so that the protective film unit 2 can be positioned in the positioning cavity 111 and be prevented from shaking. When the electronic device is placed and positioned in the positioning cavity 111, the protective film unit 2 can be aligned with the screen of the electronic device accurately.

Preferably, a step 30 protrudes inwardly from the inner side surface of the sidewall 110 to divide the positioning cavity 111 into a first accommodation chamber and a second accommodation chamber in a height direction of the frame 11. The step 30 comprises a supporting surface parallel to the bottom wall 113 and a side surface extending perpendicularly from the supporting surface. The bottom wall 113 and the side surface of the step 30 cooperatively form the first accommodation chamber for accommodating the protective film unit 2. The side surface of the sidewall 110 and the supporting surface of the step 30 cooperatively form the second accommodation chamber for accommodating the electronic device.

Figure 1:
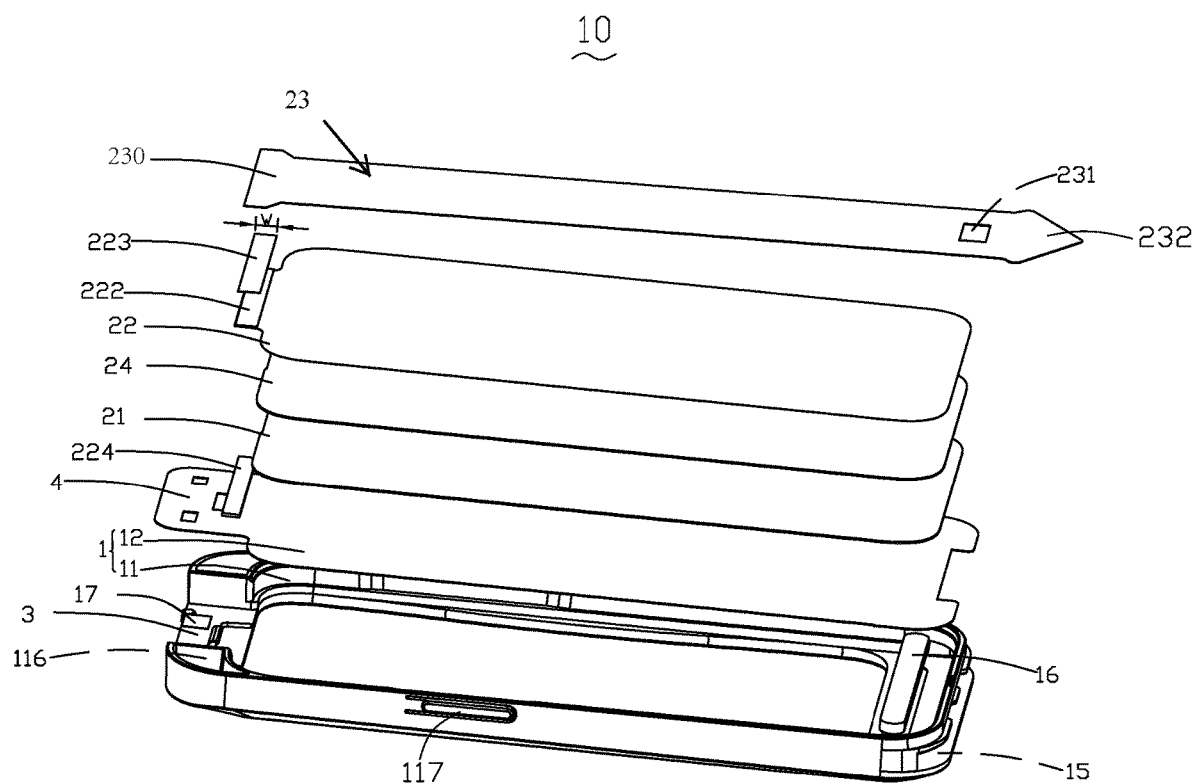
FIG. 1 is an exploded view of a film applicator in accordance with an embodiment of the present disclosure.

Referring to FIG. 1, the bottom wall 113 defines an operation window 13 for exposing the positioning film 12 to outside the bottom wall 113 of the frame 11. The first accommodation chamber is located between and in communication with the second accommodation chamber and the operation window 13.

Specifically, the operation window 13 can be a through opening for exposing the positioning film 12 to outside the bottom wall 113 of the frame 11, which allows the user to watch the process of mounting the protective film 12 to the screen of the electronic device and press the positioning film 12 during the process of operation. Thus, the process of mounting the protective film 12 to the screen of the electronic device 80 is visual.

Referring to FIGS. 1-4, the frame 11 further comprises a first positioning portion 3 which is located at one end of the positioning cavity 111. The positioning film 12 comprises a second positioning portion 4 formed at an end thereof. The positioning film 12 can be fixedly or detachably mounted to the frame 11 via cooperation of the first and second positioning portions 3 and 4.

Specifically, when the first positioning portion 3 and the second positioning portion 4 are fixedly connected to each other, the positioning film 12 is fixed in the positioning cavity 111 or fixed at one side of the positioning cavity 111 so that the protective film unit 2 adhered to the positioning film 12 can also be fixed in the positioning cavity 111, that is, the protective film unit 2 is unmovable relative to the frame 11 at least in one direction. When the first positioning portion 3 and the second positioning portion 4 are detachably connected to each other, the positioning film 12 can not only be mounted in the positioning cavity 111 or at one side of the positioning cavity 111 but also be replaceable. That is, when the positioning film 12 is broken, a new positioning film 12 can be used to replace the broken one.

Referring to FIGS. 6, the first positioning portion 3 comprises a first positioning protrusion 31, the second positioning portion 4 define a positioning hole 41. The first positioning protrusion 31 can be engaged in the positioning hole 41.

Specifically, the positioning hole 41 is sleeved on the positioning protrusion 31 to cause the positioning film 12 to be fixed in the positioning cavity 111 or at one side of the positioning cavity 111 so that shaking of the protective film unit 2 adhered to the positioning film 12 relative to the frame 11 is prevented. When the positioning protrusion 31 is disengaged from the positioning hole 41, the positioning film 12 can be moved away from the frame 11 to thereby allow replacement of the positioning film 12. Furthermore, the positioning hole 41 is formed at the positioning film 12, which makes the positioning film 12 omit the material of forming a detachable connection structure. The structure of the positioning film 12 is simplified.

Referring to FIGS. 1-3 and 6-7, the positioning protrusion 31 comprises a first positioning protrusion 311. The first positioning protrusion 311 comprises a barb 3111 formed at a free end thereof. Specifically, the barb 3111 is convexly formed at a surface of the first positioning protrusion 311 facing the positioning cavity 111. The barb 3111 comprises at least one step convexly formed at the surface of the first positioning protrusion 311 facing the positioning cavity 111. The positioning hole 41 comprises a first positioning hole 411 which is sleeved on the first positioning protrusion 311. The barb 3111 extends through the first positioning hole 411 to prevent the second positioning portion 4 of the positioning film 12 escaping from the first positioning protrusion 311.

Referring to FIGS. 1-2, 4 and 6-7, the positioning protrusion 31 further comprises a second positioning protrusion 312 which has a shape different from that of the first positioning protrusion 311. The number of the second positioning protrusion 312 is two. Optionally, the two second positioning protrusions 312 have different shapes.

Specifically, in order to enhance the connection between the positioning film 12 and the frame 11, a second positioning protrusion 312 is provided, and the shape of the second positioning protrusion 312 is different from that of the first positioning protrusion 311, so that the orientation of the engaging position of the second positioning protrusion 312 where the second positioning protrusion 312 engages with the edge of the second positioning hole 412 is different from that of the engaging position of the first positioning protrusion 311 where the first positioning protrusion 311 engages with the edge of the first positioning hole 411. Preferably, the orientation of the engaging position of the second positioning protrusion 312 where the second positioning protrusion 312 engages with the edge of the second positioning hole 412 is opposite to that of the engaging position of the first positioning protrusion 311 where the first positioning protrusion 311 engages with the edge of the first positioning hole 411. Thus, the second positioning portion 4 can be firmly positioned to the frame 11 by the first positioning portion 3 in different directions, for example X direction and −X direction. In the process of connecting the positioning film 12 to the frame 11, the different shapes of the positioning protrusion 311 and the second positioning protrusion 312 is helpful to prevent incorrect correspondence between the positioning protrusions and positioning holes. Mis-installation of the positioning film 12 to the frame 11 is avoided. That is, a correct connection between the positioning film 12 and the frame 11 can be easily finished. Furthermore, the two second positioning protrusions 312 has two different shapes, which enhances the effect of anti-misinstallation and enables the correct connection between the positioning film 12 and the frame 11 be directly and accurately completed. Preferably, the first positioning protrusion 311 and the second positioning protrusion 312 are offset from each other in the longitudinal direction of the frame 11. The first positioning protrusion 311 is closer to the operation window 13 than the second positioning protrusion 312. Preferably, the first positioning protrusion 311 and the second positioning protrusion 312 are offset from each other in the transverse direction of the frame 11.

Referring to FIG. 2, the first positioning portion 3 defines an opening 14 which is in communication with the positioning cavity 111. The positioning protrusions 31 extend from the bottom of the opening 14. After the positioning film 12 is mounted to the frame 11, the second positioning portion 4 of the positioning film 12 is received in the opening 14 and engaged with the first positioning portion 3.

The second positioning portion 4 of the positioning film 12 is engaged with the first positioning portion 3 in the opening 14 which is in communication with the positioning cavity 111, which enable the positioning film 12 be fixed in the positioning cavity 111 or at one side of the positioning cavity 111 and transversed to the sidewall 110 so that the protective film unit 2 can be positioned in the positioning cavity 111 via the positioning film 12 and transversed to the sidewall 110.

Referring to FIGS. 2 and 5, the frame 11 further comprises a through slot 15 defined in the sidewall 110. In this embodiment, the frame 11 has a rectangular shape. The sidewall 110 comprises a pair of side portions extending in a longitudinal direction of the frame 11 and a pair of end portions extending in a transverse direction of the frame 11. The end portions are respectively connected between opposite ends of the side portions. The through slot 15 is defined at a joining area between one of the end portions (the first end portion) and the bottom wall 113. The through slot 15 extends through the first end portion in the longitudinal direction to communicate with the positioning cavity 111. The first positioning portion 3 is provided at the opposite end portion of the sidewall 110. The through slot 15 and the first positioning portion 3 are respectively arranged at opposite ends of the frame 11 in the longitudinal direction of the frame 11.

Specifically, the pull film 23 of the protective film unit 2 is capable of extending through the through slot 15 to outside the frame 11 so that the user can pull it to thereby remove the release film 22 away from the protective film 21. Thus, the release film 22 can be easily and conveniently removed away from the protective film 21 via pulling the pull film 23. The operation is simple and the efficiency is increased.

Referring to FIG. 1, the frame 11 further comprises an adjusting member 16 which is convexly arranged on a surface of the bottom wall 113 of the frame 11 facing the positioning film 12 and located at an end of the bottom wall 113 close to the through slot 15. Specifically, the adjusting member 16 is located between the through slot 15 and the operation window 13. Alternatively, the adjusting member 16 is convexly arranged on a surface of the positioning film 12 facing the bottom wall 113 of the frame 11 and located at an end of the positioning film 12 close to the through slot 15. The adjusting member 16 is disposed between the positioning film 12 and the bottom wall 113 of the frame 11 and opposite to the first and second positioning portions 3/4 so that the end of the positioning film 12 away from the first and second positioning portions 3/4 is higher than the end of the positioning film 12 close to the first and second positioning portions 3/4. During the process of the protective film 21 being mounted to the screen of the electronic device, i.e., the process of the protective film 21 contacts the screen of the electronic device, the end of the protective film 21 close to the adjusting member 16 contacts the screen of the electronic device firstly, the contact area between the positioning film 12 and the bottom wall 113 of the frame 11 extends toward the other end of the protective film 21 away from the adjusting member 16 gradually, and air between the positioning film 12 and the bottom wall 113 of the frame 11 is expelled toward the other end of the protective film 21 away from the adjusting member 16 gradually and is finally discharged. Thus, the protective film 21 can be mounted to the screen of the electronic device avoiding the problem of air/bubbles trapped underneath of the protective film 21. The adjusting member 16 is made of elastic material, for example elastic foam. Thus, the adjusting member 16 can be pressed to generate an elastic force which can urge ends of the positioning film 12 and the protective film 21 away from the first and second positioning portions 3/4 toward the screen of the electronic device and make the protective film 21 gradually contact the screen of the electronic device in a direction from the adjusting member 16 toward the positioning portions 3/4.

Referring to FIGS. 1-2 and 5, a retaining protrusion 151 is convexly arranged on a wall of the through slot 15 for engaging with the pull film 23 to thereby prevent the pull film 23 from being pulled randomly. Thus, the release film 21 being pulled randomly is avoided.

Specifically, the retaining protrusion 151 is convexly arranged at a side of the through slot 15 opposite from the positioning cavity 111. The positioning film 12 is positioned to the frame 11 via the second positioning portion 4 which is located at one end of the positioning film 12. The other end of the positioning film 12 extends into the through slot 15 which limits movement of the other end of the positioning film 12 and prevents the other end of the positioning film 12 escaping from the frame 11.

Figure 13:
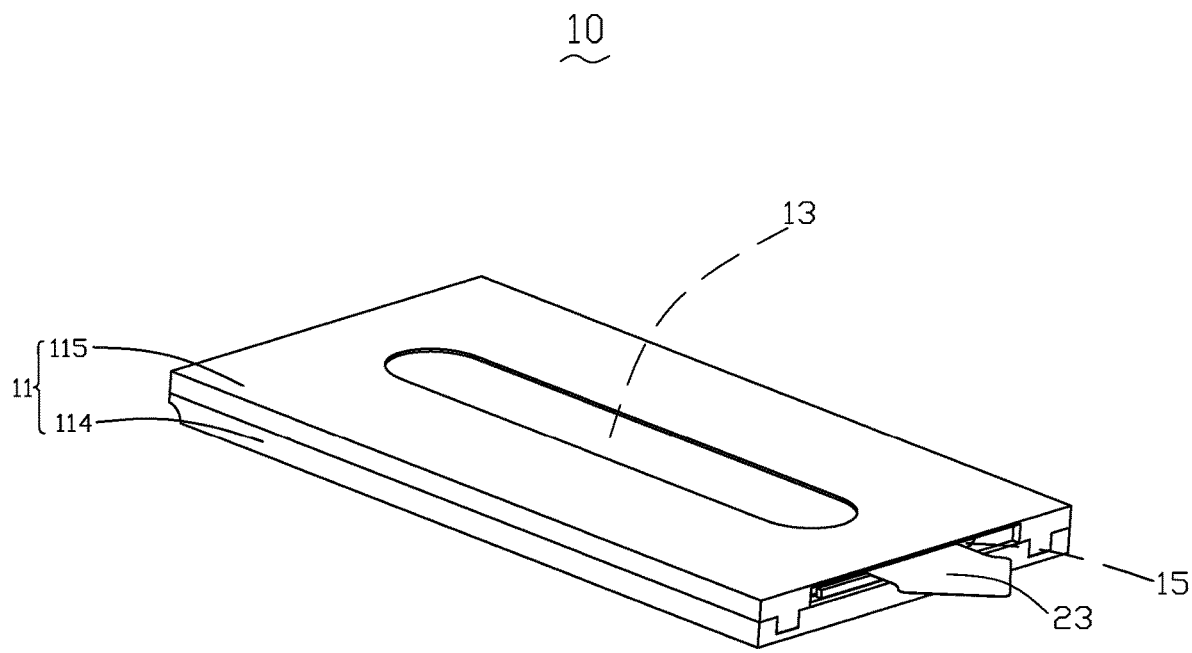
FIG. 13 is a perspective view of a film applicator in accordance with a further alternative embodiment of the present disclosure.
Figure 14:
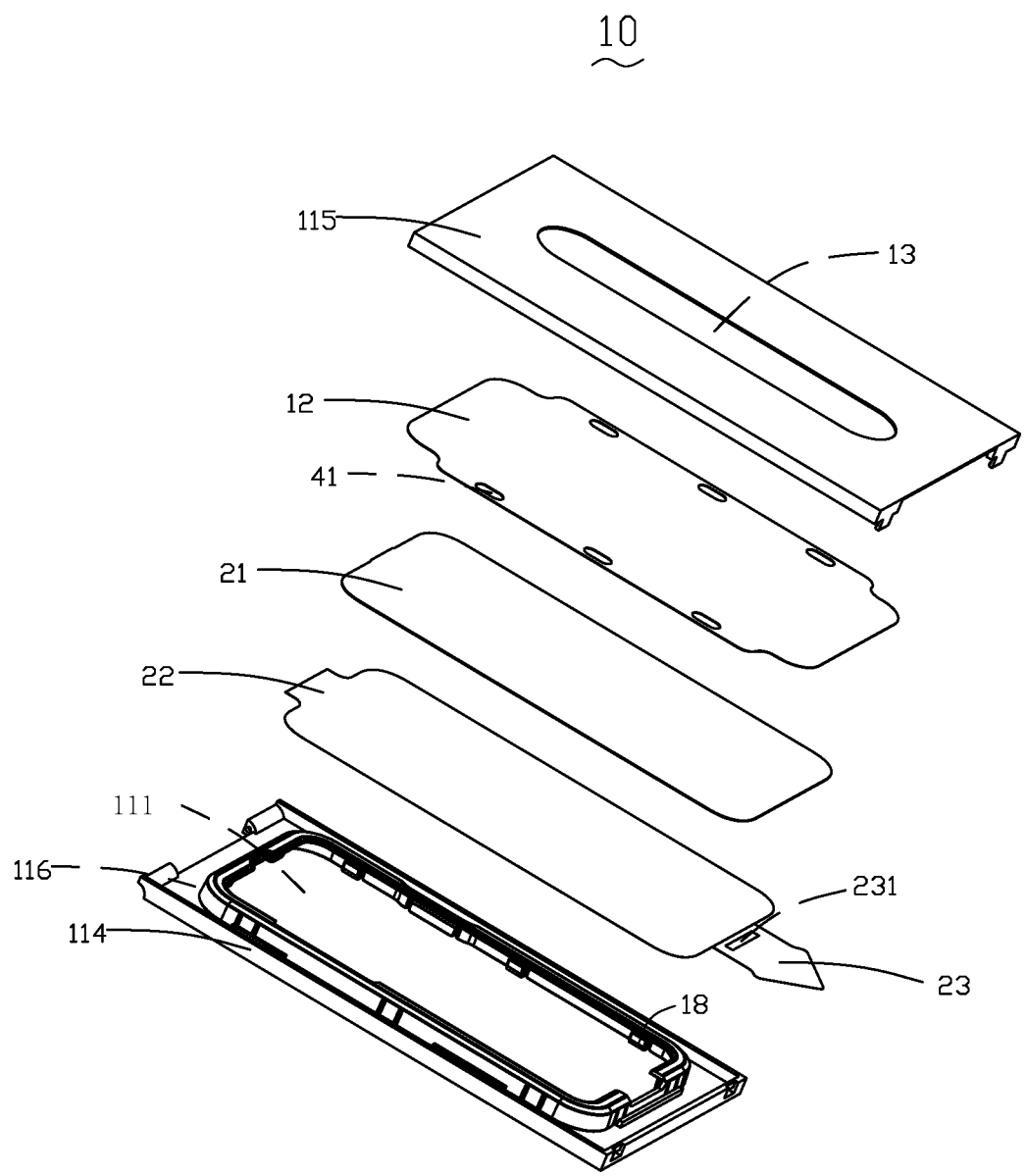
FIG. 14 is an exploded view of FIG. 13.

Referring to FIG. 13 and FIG. 14, in the positioning assembly 1 of this embodiment, the frame 11 comprises a substrate 114 and a cover 115 which are pivotably connected to each other. The positioning cavity 111 is defined in the substrate 114. The positioning film 12 is connected to the substrate 114 or the cover 115.

Specifically, when the positioning film 12 is connected to the substrate 114, the protective film unit 2 can be adhered to the positioning assembly 1 and positioned in the positioning cavity 111 via the positioning film 12 which is positioned in or one side of the positioning cavity 111. In operation, the screen of the electronic device facing the positioning cavity 111 is placed into the positioning cavity 111, i.e., the substrate 114 is sleeved on the screen of the electronic device, which results in the protective film unit 2 being aligned with the screen of the electronic device. Misalignment due to errors of users in operation is avoided. The cover 115 is then rotated toward the substrate 114 to cover the side of the electronic device opposite to the screen. Thus, the electronic device is located between the cover 115 and the substrate 114. The user is capable of pulling the pull film 23 to make the release film 22 move away from the protective film 21 so that the protective film 21 can be mounted to the screen of the electronic device. The positioning film 12 can be separated from the protective film 21 via pressing the positioning film 12. Thus, operation of the protective film 21 being mounted to the screen of the electronic device is finished. Since the electronic device and the protective film 21 are fixed in the positioning assembly 1 and not exposed to the external environment during the process of operation, the chance that dust enters between the protective film 21 and the screen of the electronic device is greatly reduced.

When the positioning film 12 is connected to the cover 15, the protective film unit 2 can be adhered to the positioning assembly 1 via the positioning film 12 and faces the positioning cavity 111. In operation, the screen of the electronic device aligning with the positioning cavity 111 is placed into the positioning cavity 111 and the screen of the electronic device faces upward. When the cover 115 is rotated toward the substrate 114 to cover the screen of the electronic device, the electronic device is located between the cover 115 and the substrate 114 and the protective film unit 2 is aligned with the screen of the electronic device. Misalignment due to errors of users in operation cab be avoided. In operation, the user is capable of pulling the pull film 23 to detach the release film 22 away from the protective film 21 so that the protective film 21 can be mounted to the screen of the electronic device. The positioning film 12 can be separated from the protective film 21 via pressing the positioning film 12. Thus, operation of the protective film 21 being mounted to the screen of the electronic device is finished. Since the electronic device and the protective film 21 are fixed in the positioning assembly 1 and not exposed to the external environment during the process of operation, the chance that dust enters between the protective film 21 and the screen of the electronic device is greatly reduced.

Referring to FIG. 13 and FIG. 14, in the positioning assembly 1 of this embodiment, the cover 115 defines an operation window 13 for exposing the positioning film 12.

The operation window 13 is defined through the cover 115 to expose the positioning film 12. Thus, the operation window 13 provides an access to the user to press the positioning film 12 and the protective film 21 toward the screen of the electronic device during operation. The operation window 13 also provides an access to the user to view inside the frame 11 and provides an access to air escaped from the gap formed between the protective film and the screen of the electronic device. Thus, the process of operation is visualizable.

Figure 15:
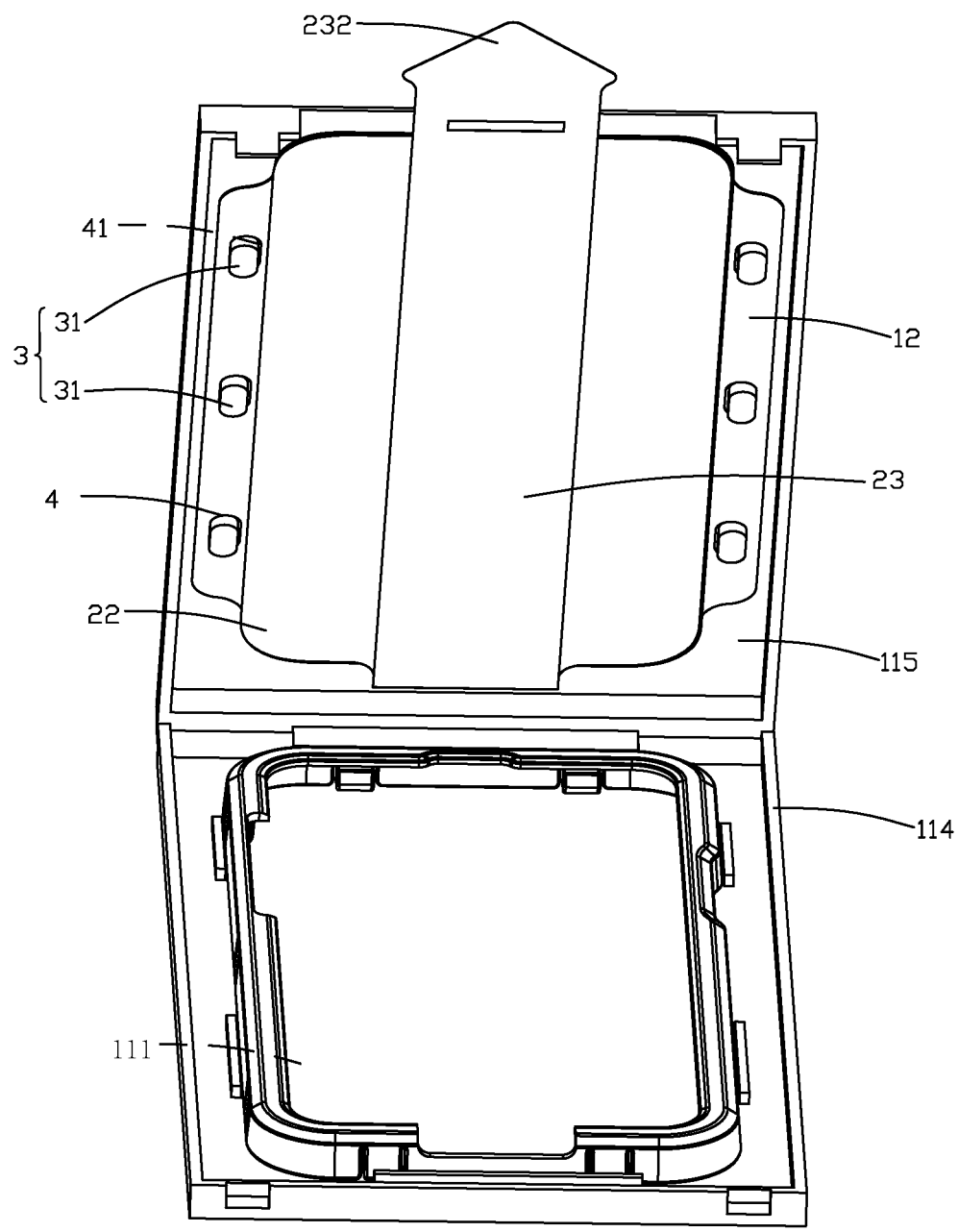
FIG. 15 is another perspective view of the film applicator of FIG. 13, showing the film applicator in an open state.
Figure 16:
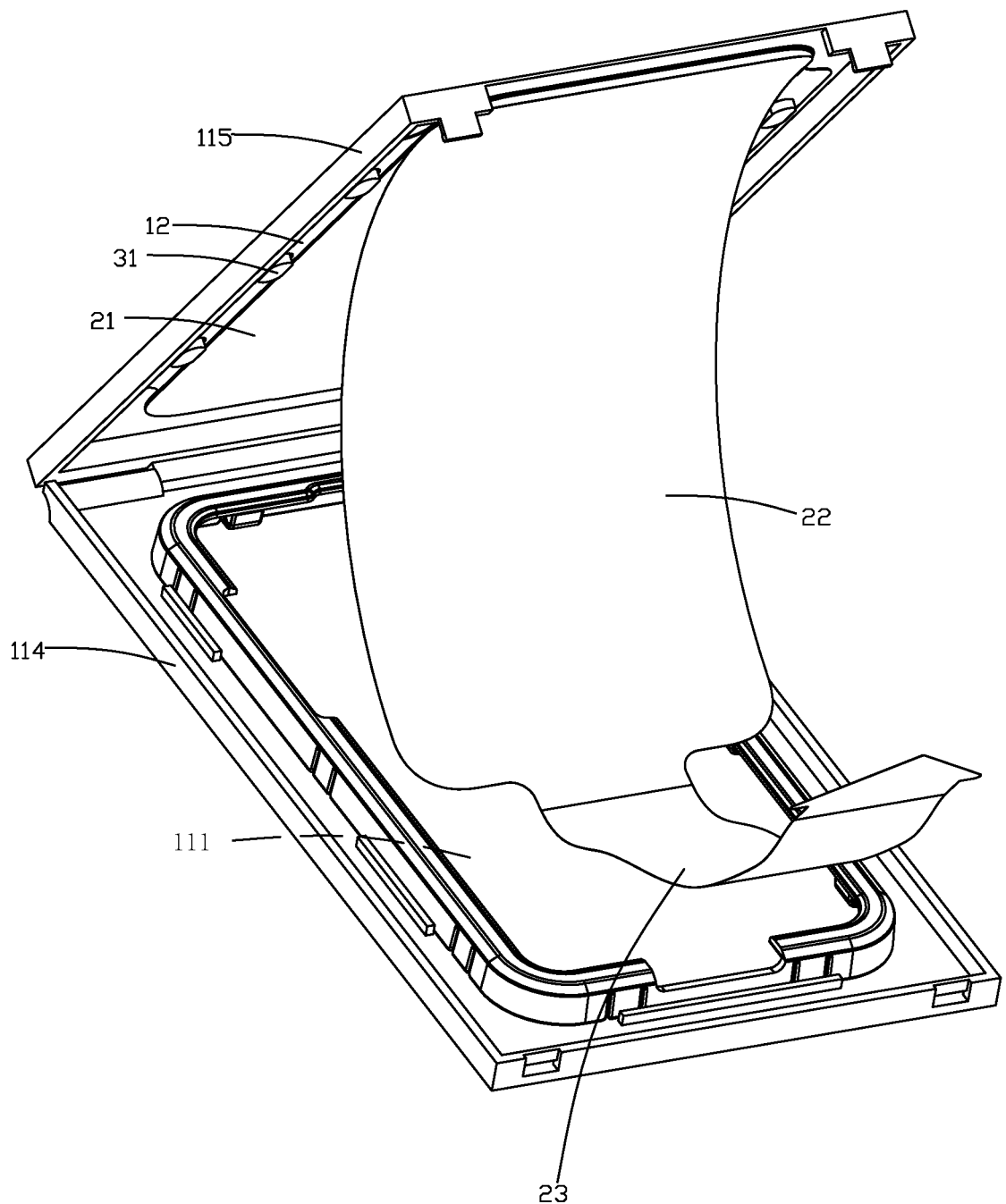
FIG. 16 is similar to FIG. 15, showing the release film being partly detached from the protective film.
Figure 17:
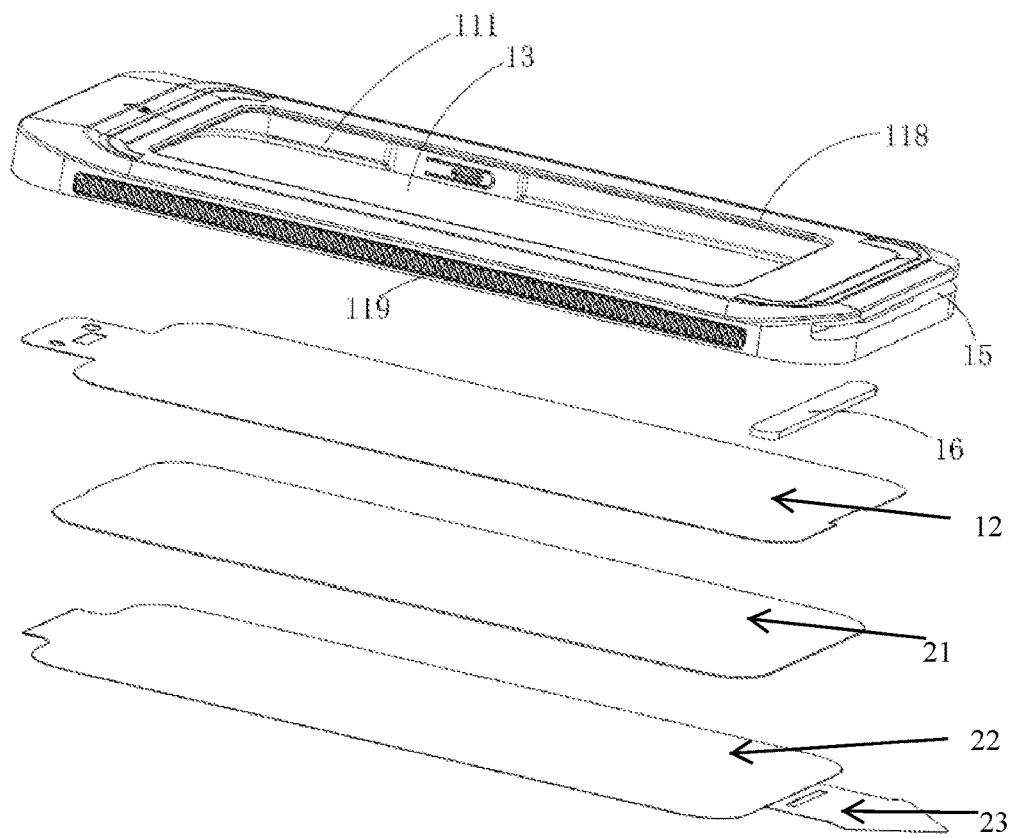
FIG. 17 is an exploded view of a film applicator in accordance with another alternative embodiment of the present disclosure.

Referring to FIG. 15, in the positioning assembly 1 of this embodiment, the cover 115 comprises a first positioning portion 3 and the positioning film 12 comprises a second positioning portion 4. The positioning film 12 is fixedly or detachably connected to the cover 114 via cooperation of the first and second positioning portions 3/4.

Specifically, when the first positioning portion 3 is fixedly connected to the second positioning portion 4, the positioning film 12 is fixed to the cover 115 so that the protective film unit 2 can be adhered to the cover 115 via the positioning film 12 and aligned with the positioning cavity 111. When the first positioning portion 3 is detachably connected to the second positioning portion 4, the positioning film 12 is connected to the cover 115 in a detachable way. Thus, the positioning film 12 is replaceable.

Referring to FIG. 15, in the positioning assembly 1 of this embodiment, the first positioning portion 3 comprises positioning protrusions 31, the second positioning portion 4 define positioning holes 41. The positioning protrusions 31 can be engaged in the positioning holes 41.

Specifically, the positioning protrusions 31 are engaged in the corresponding positioning holes 41 to cause the positioning film 12 to be secured to the cover 115 so that the protective film unit 2 can be adhered to the cover 115 via the positioning film 12 and aligned with the positioning cavity 111. When the positioning protrusions 31 are disengaged from the positioning holes 41, the positioning film 12 can be removed away from the cover 115 to thereby allow replacement of the positioning film 12. Furthermore, the positioning holes 41 are formed at the positioning film 12, which makes the positioning film 12 omit material of forming a detachable connection structure. The structure of the positioning film 12 is simplified.

Referring to FIG. 15, in the positioning assembly 1 of this embodiment, multiple positioning protrusions 31 are provided. The multiple positioning protrusions 31 are arranged at opposite sides of the cover 115. Multiple positioning holes 41 are formed in the positioning film 2. The multiple positioning holes 41 are arranged at opposite sides of the positioning film 2 at positions corresponding to the positioning protrusions 31 respectively.

Specifically, when multiple positioning holes 41 are sleeved on the corresponding multiple positioning protrusions 31, the opposite sides of the positioning film 12 are fixed on the cover 115 to ensure that the positioning film 12 is limited within the cover 115 and not moveable freely, thereby limiting the protective film unit 2 bonded and connected to the positioning film 12 within the face cover 115. Thus, the cover 115 can be rotated towards the substrate 114 to precisely align the protective film unit 2 with the screen of the electronic device.

Referring to FIG. 13, in the positioning assembly 1 of this embodiment, the frame 11 further comprises a through slot 15. The through slot 15 is defined at an end of the frame 11 opposite to another end of the frame 11 where the substrate and the cover 115 are pivotably connected to each other.

Specifically, the free end of the pull film 23 of the protective film unit 2 extends through the through slot 15 to reach outside the frame 11. Thus, the pull film 23 can be pulled by the user pulling the free end of the pull film 23 to drive the release film 22 to detach from the protective film 21, facilitating the user's operation and improving the efficiency of operation.

Referring to FIG. 1, in some embodiments, the frame 11 of the positioning assembly 1 further comprises an adhesive member 17 which is located between the first positioning portion 3 and the second positioning portion 4. The positioning film 12 is adhered to the frame 11 via the adhesive member 17.

Specifically, an adhesive member 17 is added between the first positioning portion 3 and the second positioning portion 4 to enhance the connection between the positioning film 12 and the frame 11 and to avoid the following situations: during the transportation of the film applicator 10, the positioning film 12 being separated from the frame 11 due to the insufficient connection between the first positioning portion 3 and the second positioning portion 4, which will affect the usage effect; the positioning film 12 being separated from the frame 1 when it is pressed during the operation, which will affect the user's experience.

Figure 9:
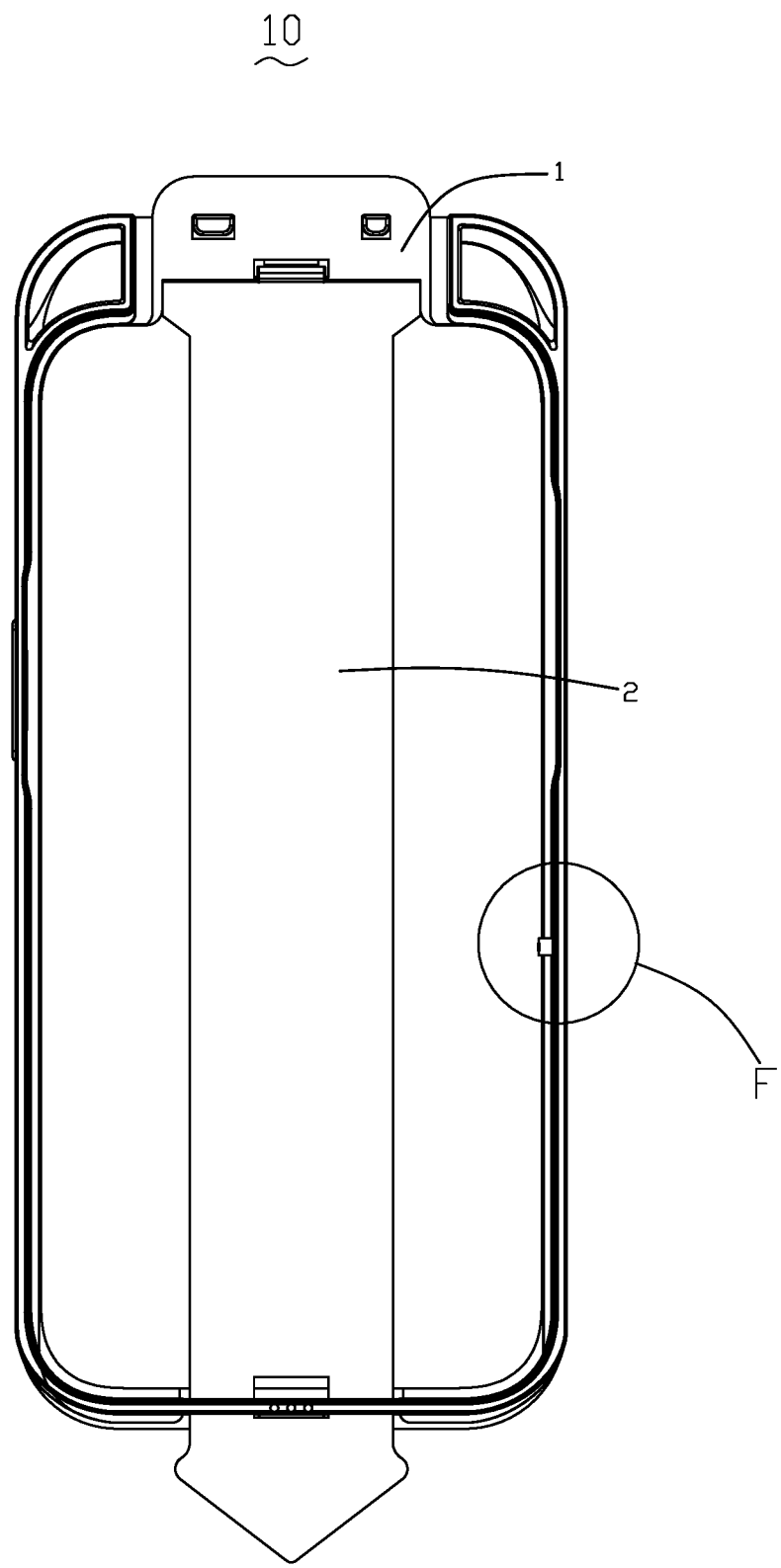
FIG. 9 is a top plan view of a film applicator in accordance with an alternative embodiment.
Figure 10:
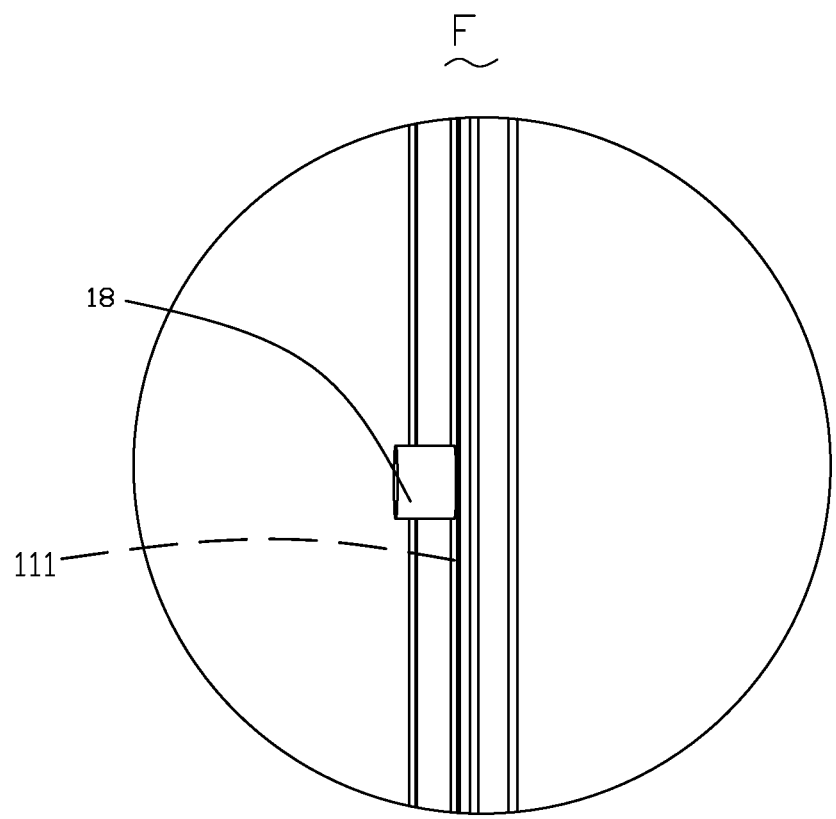
FIG. 10 is an enlarged view of circled portion F of FIG. 9.

Referring to FIGS. 9, 10 and 14, in some embodiments, the positioning assembly 1 further comprises a retaining member 18 which is arranged on the sidewall of the positioning cavity 111 and orientated to one side of the positioning cavity 111.

Specifically, the retaining member 18 arranged on the sidewall of the positioning cavity 111 is configured for retaining the electronic device in the positioning cavity 111 and preventing the electronic device from shaking in the positioning cavity 111, which facilitates to precisely mount the protective film to the screen of the electronic device. Manufacturing tolerances may exist between different electronic devices with the same production model. As a result, a certain amount of lash or gap could exist between the electronic device and the frame. The retaining member 18 is configured to compensate for the lash or gap to ensure that the electronic devices with tolerances can be positioned in the frame properly.

Referring to FIGS. 9, 10 and 14, in some embodiments, the retaining member 18 comprises a deformable boss protruding from the sidewall of the positioning cavity 111 or an elastic structure which is fixed to or detachably connected to the sidewall of the positioning cavity 111.

Specifically, the retaining member 18 comprising a deformable boss or an elastic structure means the retaining member 18 has an elastic performance and is capable of elastically deformed. Under the elastic action of the retaining member 18, i.e. when the deformation amount of the retaining member 18 is large enough, the retaining member 18 provided on the sidewall of the first accommodation chamber 111 can also firmly maintain the electronic devices of different sizes or models in the accommodation chamber 111 via elastically abut against the electronic devices. Thus, the practicality of the film applicator 10 is increased.

Referring to FIGS. 1 and 2 and 14, in some embodiments, the frame 11 further comprises a weight reduce structure 116 which comprises any one or more of cutout, notch, opening, aperture, hole and avoid. In some embodiments, the frame 11 further comprises a flexible cantilever 117 which comprises a fixed end and a free end movable relative to the fixed end. The flexible cantilever 117 acts as a button structure 117 configured for pressing a button of the electronic device. The side portions of the sidewall 110 comprises at least one recessed portion 112 sunken outwardly from the inner side surface of the sidewall 110 in order to avoid other buttons protruding from sides surface of the electronic device.

Specifically, by reducing the weight of the positioning assembly 1 through the weight reducing structure 116, the transportation cost of the positioning assembly 1 can be reduced and the manufacturing cost of the positioning assembly 1 can be reduced too. Optionally, the weight reduction structure 116 is a groove/slot structure, a hole/opening structure, or a void/hollow structure or a combination of two or more groove/slot structure, hole/opening structure, and void/hollow structure.

Before operation, it is necessary to clean the dust on the screen of the electronic device. If the button on the side wall of the electronic device is pressed, the screen will light up, making it not easy to see the dust on the screen and difficult to clean the dust on the screen, which is not conducive to subsequent film application operations. By setting the button structure 117 corresponding the button of the electronic device, it is possible to prevent the button on the side wall of the electronic device being pressed by the sidewall of the positioning cavity 111 when the electronic device is placed in the positioning cavity 111, thereby avoiding continuous illumination of the electronic device screen and affecting the cleaning work before film application. Moreover, users can operate the electronic device placed in the positioning cavity 111 through the button structure 117.

Referring to FIGS. 1 and 14, in some embodiments, the protective film unit 2 comprises a protective film 21, a release film 22 and a pull film 23. The release film 22 is mounted on one side of the protective film 21. One end of the pull film 23 is connected to one end of the release film 22.

Specifically, the user pulls the pull film 23 to drive the release film 22 to detach from the protective film 21, thereby allowing the protective film 21 to be adhered to the screen of the electronic device. Then, by pressing the positioning film 12 connected to the protective film 21, the positioning film 12 is separated from the protective film 21, and finally the protective film 21 is adhered to the screen of the electronic device. Preferably, the protective film 21 and the positioning film 12 are bonded and connected to each other via a low viscosity connection, so that the positioning film 12 can be easily separated from the protective film 21 by pressing the positioning film 12. Due to the fact that during the entire process of the release film 22 detaching from the protective film 21, the screen and protective film unit 2 of the electronic device are both located within the positioning assembly 1, and the screen of the electronic device and the protective film unit 2 are not exposed to the external environment, dust cannot easily enter between the protective film 21 and the screen of the electronic device. Moreover, during the process of the release film 22 being detached from the protective film 21, static electricity will be generated and attract and take away dust, which further reduces the dust between the protective film 21 and the screen of electronic devices and reduces the failure rate of film application.

Figure 11:
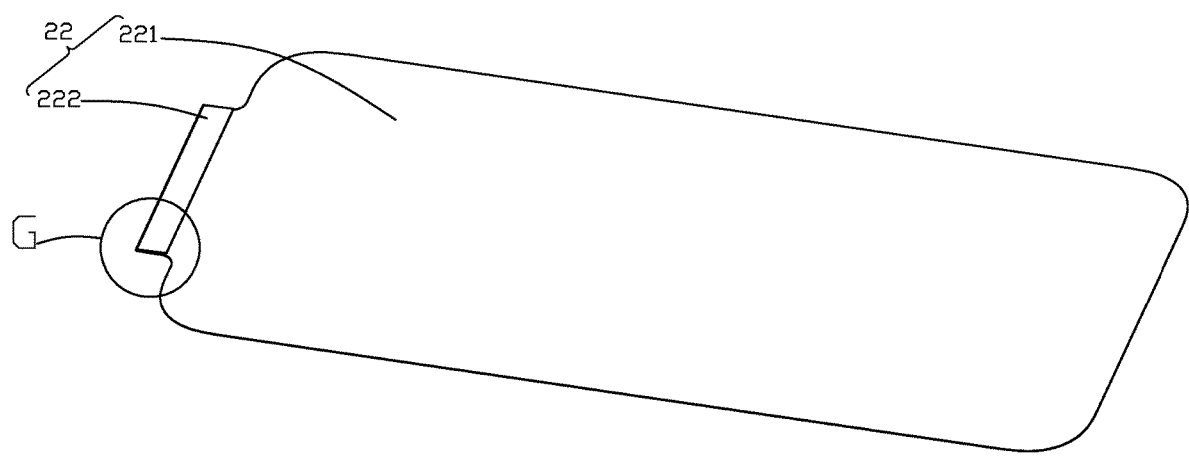
FIG. 11 illustrates a protective film of the film applicator of FIG. 1.

Referring to FIG. 11, in some embodiments, the release film 22 comprises a body 221 having sizes matching with sizes of the protective film 21 and a connection part 222 extending from one end of the body 221. The body 221 is adhered to one side of the protective film 21 and the connection part 222 is located outside the protective film 21. One end of the pull film 23 is connected to the connection part 222.

The connection part 222 located outside the protective film 21 does not contact the protective film 21 and has a width (transverse size) less than that of the body 221, which facilitates to detach the body 221 from the protective film 21 via exerting a pulling force on the connection part 222. The pull film 23 is connected to the connection part 222 of the release film 22 so that the pull film 23 is capable of easily detaching the body 221 from the protective film 21 via pulling the connection part 222 when the pull film 23 is pulled.

Referring to FIGS. 1 and 14-16, the end of the pull film 23 can be integrally formed with the connection part 222 as an integral structure, which is convenient for production with less production processes.

Alternatively, the end of the pull film 23 can be adhered to the connection part 222, of which the production cost is reduced as less material is wasted. Specifically, the end of the pull film 23 can be adhered to a side of the connection part 222 opposite to the protective film 21.

Figure 12:
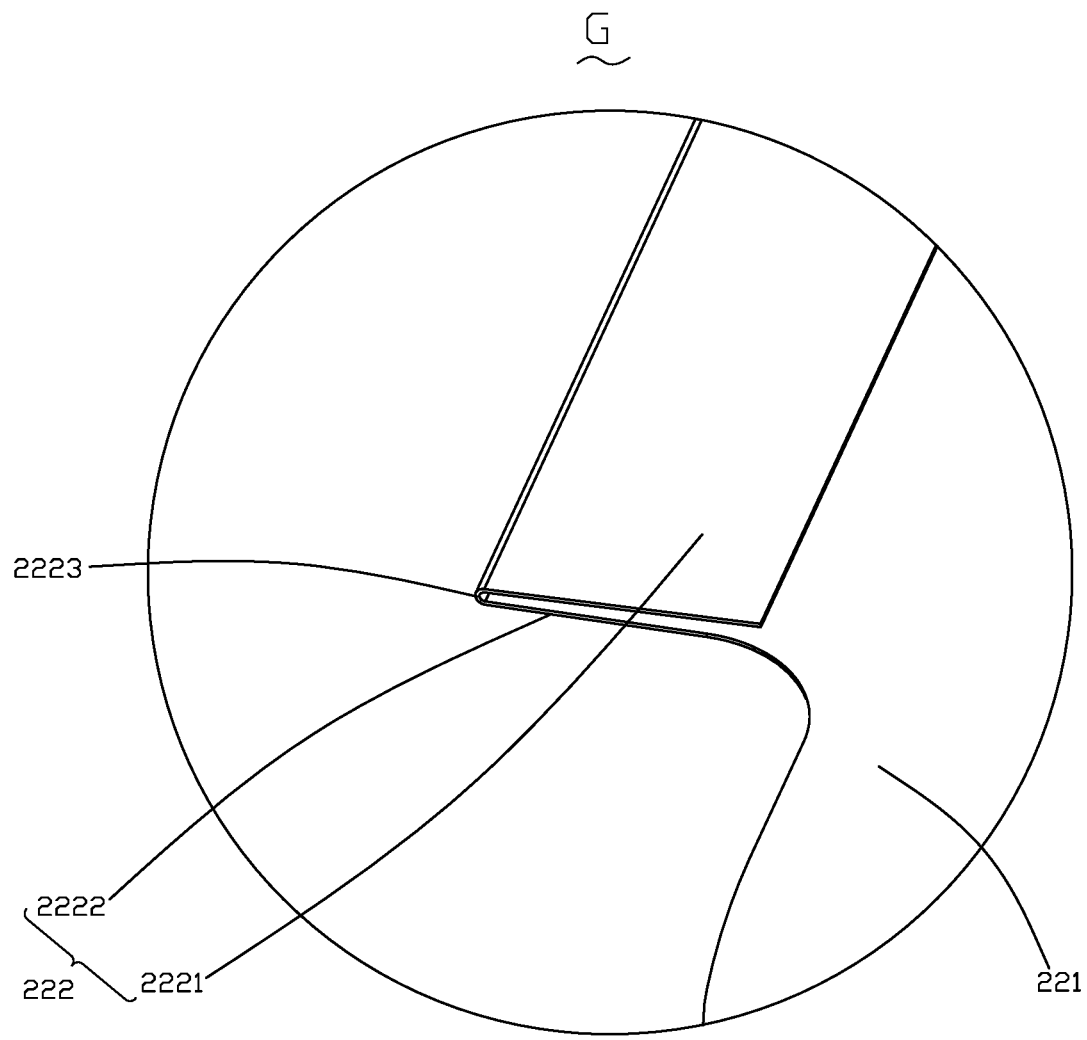
FIG. 12 is an enlarged view of circled portion G of FIG. 9.

Referring to FIGS. 11 and 12, in this embodiment, the connection part 222 comprises a first section 2221, a second section 2222 and a connection section 2223 connected between the first section 2221 and the second section 2222. The second section 2222 extends from the body 221 in the longitudinal direction. The first section 2221 is located above the second section 2222 and connected to the second section 2222 via the connection section 2223. A gap is formed between the first section 2221 and the second section 2222 and the connection end 230 of the pull film 23 is connected to the first section 2221, which facilitates to detach the release film 22 away from the protective film 21 when the pull film 23 is pulled.

The second section 2222 is connected to the positioning film 12 so that a connection between the release film 22 and the positioning film 12 is achieved. Thus, during the transportation process, the release film 22 is not easy to be separated from the protective film 21 from the second section 2222. That is, the situation that the release film 22 is inadvertently detached from the protective film 21 by the second section 2222 during the transportation process is avoided. The connection between the release film 22 and the positioning film 12 provides better protection to the surface of the protective film 21 contacting the release film 22. It can be understood that the positioning film 12 is connected with the second section 2222 through an adhesive member 224, so as to realize the connection between the positioning film 12 and the release film 22, and avoid the situation that the release film 22 is inadvertently detached from the protective film 21 from the second connecting part 2222. Optionally, the dimension of the adhesive member 224 can match that of the connection part 222.

Preferably, the first section 2221, the second section 2222 and the connection section 2223 have the same width in the transverse direction of the frame 11. The connection section 2223 is flexible and foldable, which allows the first section 2221 to rotate relative to and to be stacked over the second section 2222 to thereby allow the pull film 23 to stack over the release film 22. The volume of a space occupied by the release film 22 and pull film 23 is effectively reduced, and the cost of packaging is reduced. It is more convenient for users to use.

Referring to FIG. 1, the connection end 230 of the pull film 23 is connected to the connection part 222 of the release film 22. Preferably, the size of the overlapped area between the connection end 230 and the connection part 222 in the longitudinal direction of the frame 11 is in a range of 3 mm to 20 mm.

If the width of the overlapped area between the connection end 230 and the connection part 222 is less than 3 mm, the connection strength of the pull film 23 and the release film 22 is not big enough, resulting in a poor pulling effect of the pull film 23 exerted on the release film 22. If the width of the overlapped area between the connection end 230 and the connection part 222 is greater than 20 mm, it will result in a high production cost and a poor use experience of the pull film 23 driving the release film 22. More preferably, the width of the overlapped area between the connection end 230 and the connection part 222 is in a range of 4 mm to 8 mm. It is understandable that the connection end 230 and the connection part 2222 can be connected by an adhesive member 223. The adhesive member 223 has a width W which is the same as that of the overlapped area between the connection end 230 and the connection part 222. The width W of the adhesive member 223 is in a range of 3 mm to 20 mm, preferably, the width W is in a range of 4 mm to 8 mm.

Referring to FIGS. 1, 6, 9, 13, and 17, the free end of the pull film 23 opposite to the connection end 230 extends beyond the protective film 21. The free end of the pull film 23 defines a hole 231 and/or the free end of the pull film 23 is provided with a pulling indication sign 232.

Specifically, the free end of the pull film 23 extends beyond the protective film 21, which facilitates the user to pull the pull film 23 by holding the free end of the pull film 23. The hole 231 of the pull film 23 cooperates with the retaining protrusion 151 to prevent the pull film 23 from moving arbitrarily and to thereby prevent the release film 22 from being detached from the protective film 21 unintentionally. The pulling indication sign 232 is configured to indicate the user to pull the pull film 23 in a correct direction.

Referring to FIG. 1, the protective film unit 2 further comprises an adhesive layer 24 configured to adhere/bond the release film 22 to the protective film 21. The adhesive layer 24 is disposed between the protective film 21 and the release film 22. The adhesive force formed between the adhesive layer 21 and the protective film 21 is greater than the adhesive force formed between the adhesive layer 24 and the release film 22. Thus, the release film 22 can be easily detached from the protective film 21 while maintaining the adhesive layer 24 on the protective film 21 such that the protective film 21 can be adhered to the screen the electronic device by the adhesive layer 24.

Specifically, the adhesive layer 24 can be made of AB glue which is composed of OCA optical glue and silica gel. OCA optical glue has a viscosity greater than that of silica gel. The layer of AB glue made of OCA optical glue is adhered to the protective film 21 while the layer of AB glue made of silica gel is adhered to the release film 22.

Referring to FIGS. 1, 9 and 13, a film applicator 10 is provided. The film applicator 10 comprises a protective film unit 2 described above and a positioning assembly 1 described above.

In some embodiments, the free end of the pull film 23 is capable of extending to outside the frame 11 via the through slot 15. The free end of the pull film 23 comprises a storage state and a use state. When the free end of the pull film 23 is at the storage state, the free end of the pull film 23 is located within the frame 11, which can effectively prevent the pull film 23 from being pulled when the film applicator 10 is not used. When the free end of the pull film 23 is at the use state, the free end of the pull film 23 extends to outside the frame 11 via the through slot 15, which facilitates the user to pull the free end of the pull film 23 to thereby detach the release film 22 away from the protective film 21.

Figure 8:
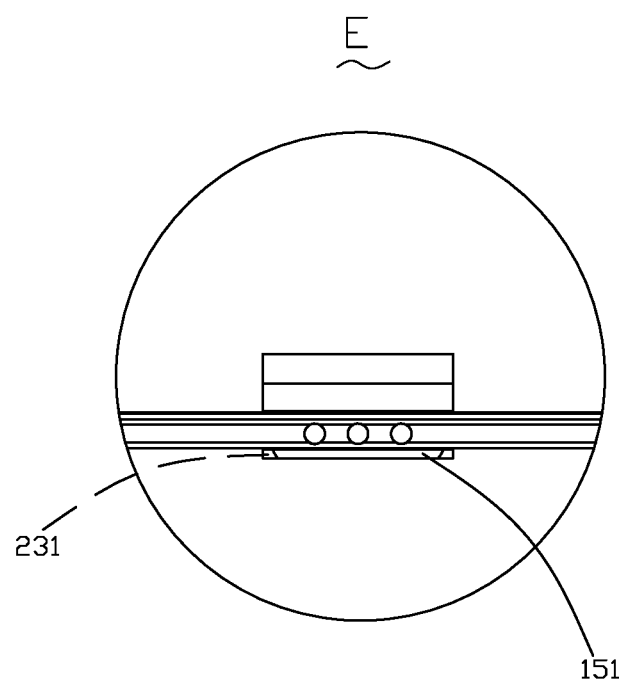
FIG. 8 is an enlarged view of circled portion E of FIG. 6.

Referring to FIGS. 6 and 8, the free end of the pull film 23 defines a through hole 231. A retaining protrusion 151 is convexly arranged on a wall of the through slot 15. When the free end of the pull film 23 extends through the through slot 15 to outside the frame 11, the retaining protrusion 151 can be engaged in the through hole 231 of the pull film 23 to thereby keep the free end of the pull film 23 outside the frame 11. In addition, when the retaining protrusion 151 is engaged in the through hole 231 of the pull film 23, the release film 22 can be prevented from being pulled by the pull film 23 randomly. Thus, the release film 22 can effectively protect the protective film 21 from being polluted by dust before operation. When the released film 22 need to be detached from the protective film 21, the user can operate the free end of the pull film 23 to disengage the retaining protrusion 151 from the through hole 231 of the pull film 23 and then pull the free end of the pull film 23 to thereby detach the release film 22 from the protective film 21.

FIGS. 17-21 illustrate a film applicator in accordance with a further embodiment of the present application. The film applicator can be used to apply a protective film to a screen of an electronic device, such as a mobile phone, a tablet computer, etc., and a mobile phone is taken as an example in this embodiment. The film applicator comprises a positioning assembly 1 and a protective film unit. The positioning assembly 1 comprises a frame 11 and a positioning film 12. The frame 11 comprises a void structure running through the front and back sides of the frame 11 in a depth direction of the frame 11. The void structure comprises a positioning cavity 111 and an operation window 13 facing and being communicated with the positioning cavity 111. The positioning film 12 is secured to the frame 11 and faces the operation window 13. The protective film unit is positioned and fixed on one side of the positioning cavity 111 close to the operation window 13 by the positioning film 12. The protective film unit comprises a protective film 21, a release layer 22 and a pull film 23 connected sequentially. The protective film 21 is positioned between the positioning film 12 and the release film 22.

The sidewall of the void structure is provided with an inner extension portion 118 which extends inwardly and perpendicularly from the sidewall of the void structure. The inner extension portion 118 is arranged along the circumferential direction of the operation window 13 to thereby surround the operation window 13, and the positioning cavity 111 is located on one side of the extension portion 118 and the operation window 13. By arranging the inner extension portion 118, the overall structural strength of the frame 11 can be enhanced, in particular, the structural strength of the left and right side portions of the sidewall of the frame 11 can be significantly enhanced, the deformation of the frame 11 in the process of mounting the protective film is avoided, so that the problems such as the protective film being blocked and the protective film falling out caused by the deformation of the operation window 13 is avoided. The protective film is prevented from being stuck and affecting exhaust during the process of operation. Furthermore, during the process of the release film being detached from the protective film, the inner extension portion 118 can block the protective film and prevent the protective film from warping, to thereby avoid randomly and disorderly air exhaust due to the protective film touches the screen of the electronic device when it is warped and rebounded. At the same time, the area of the operation window 13 is reduced due to arrangement of the inner extension portion 118. The area of the operation window 13 is smaller than the area of the protective film. Thus, the inner extension portion 118 has a limiting function and the protective film unit is limited in the positioning cavity 111 by the inner extension portion 118. The problems such as the protective film being stuck and the protective film falling out are completely avoided. The exhaust air visualization in the operation is satisfied.

Figure 18:
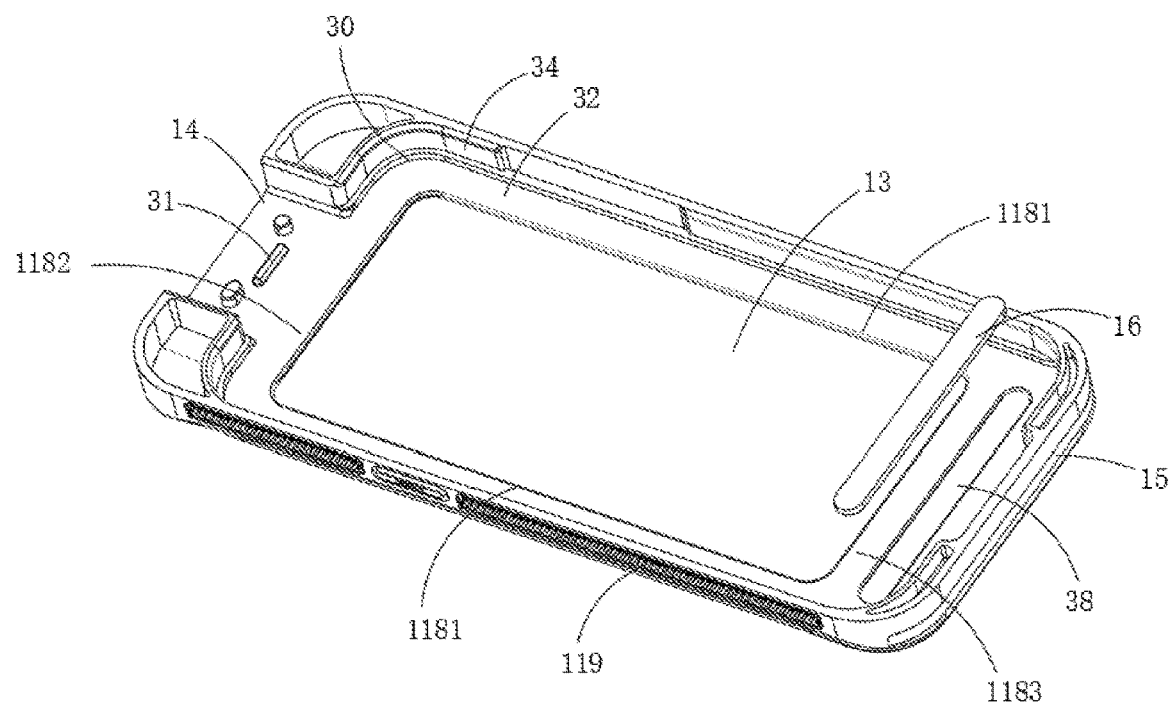
FIG. 18 is an exploded view of a frame of the film applicator of FIG. 17.
Figure 19:
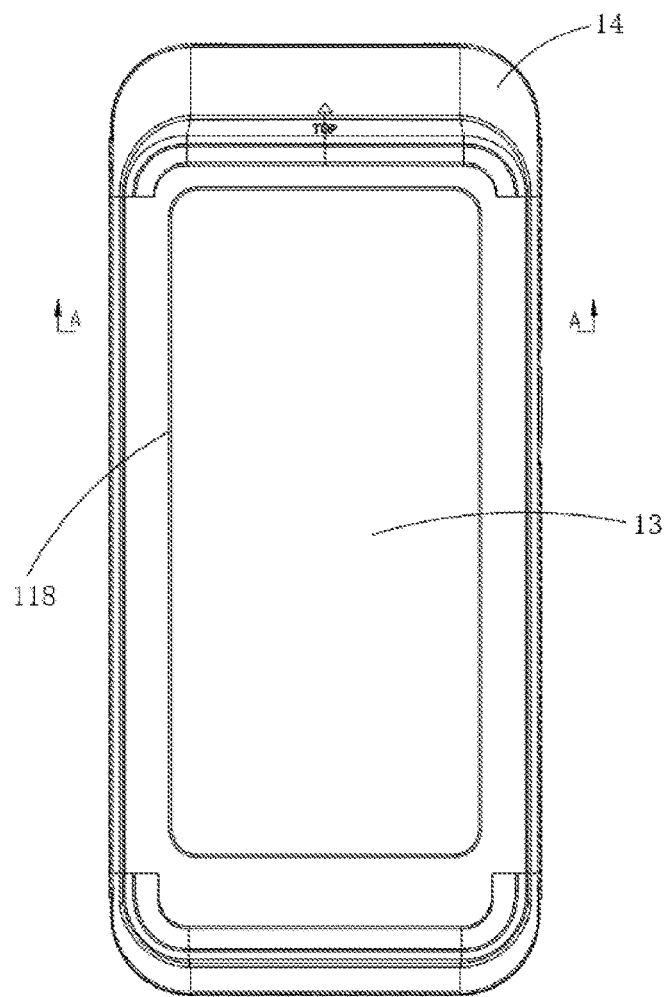
FIG. 19 is a front view of the frame of the film applicator of FIG. 17.
Figure 20:
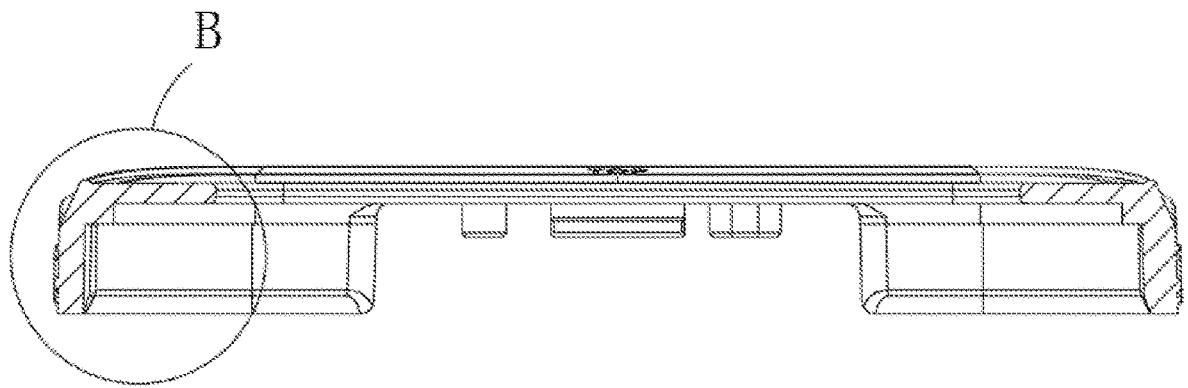
FIG. 20 is a cross section view of FIG. 19 taken along line A-A.
Figure 21:
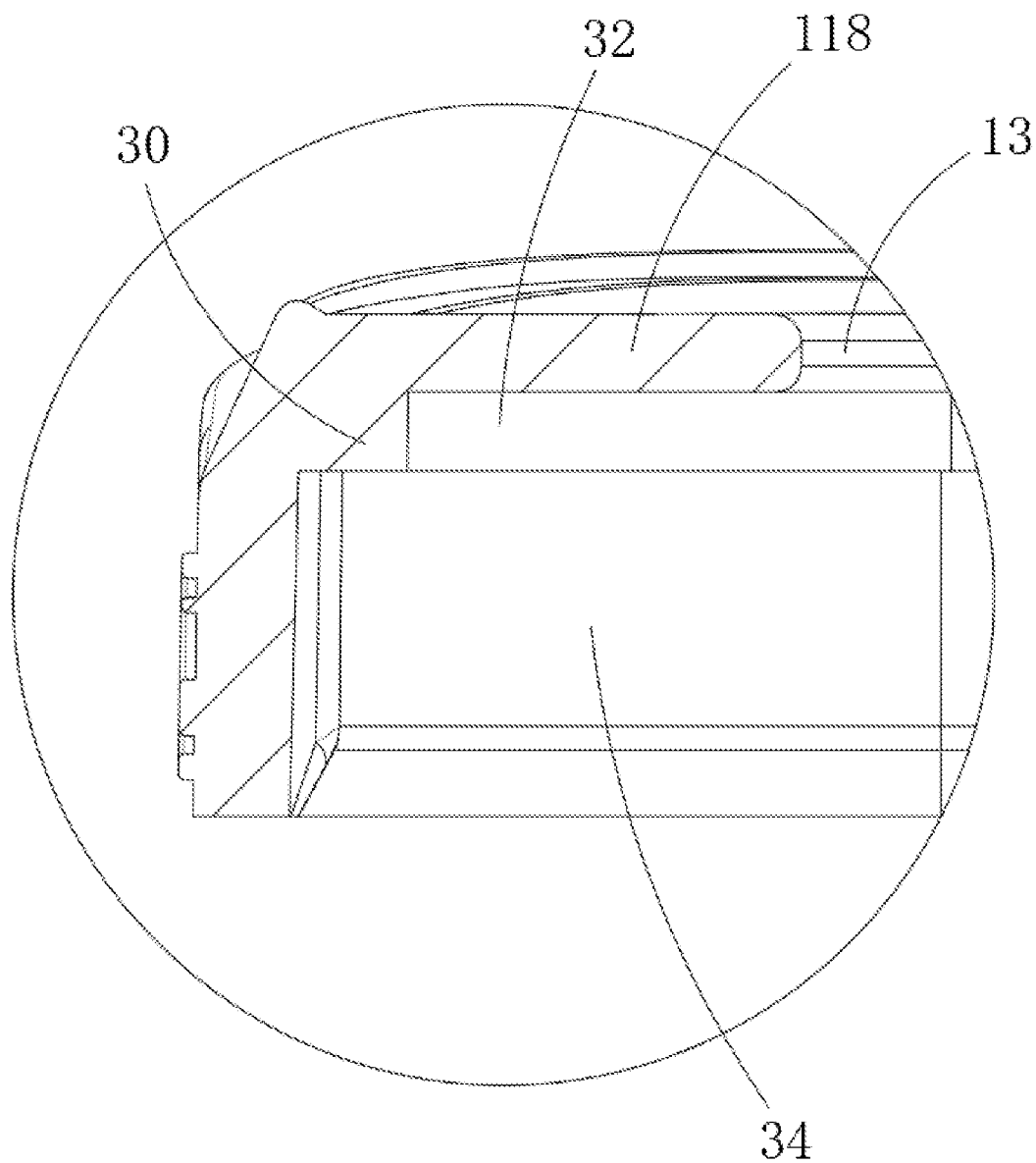
FIG. 21 is an enlarged view of a circled portion B of FIG. 20.

More specifically, as shown in FIGS. 18 and 21, a step 30 is formed between the inner extension portion 118 and the sidewall of the positioning cavity 111. The step 30 is located at the connecting corner of the inner extension portion 118 and the sidewall of the frame 11. Preferably, the step 30 and the frame 11 and the extension portion 118 are integrally formed of the same material. The step 30 divides the positioning cavity 111 into a first accommodation chamber 32 for accommodating the protective film unit and the second accommodation chamber 34 for accommodating a mobile phone. The first accommodation chamber 32 and the second accommodation chamber 34 are in communication with each other. The first accommodation chamber 32 is located between the operation window 13 and the second accommodation chamber 34.

Preferably, the inner extension part 118 and the frame 11 are integrally formed as a single unitary structure. The inner extension part 118 extends inwardly from the inner surface of the sidewall of the frame 11, and it can also say that the inner extension part 118 extends inwardly from the inner surface of the step 30.

In the illustrated embodiment, a plurality of recessed portions is arranged on the sidewall of the second accommodation chamber 34. The recessed portions are recessed outwardly to form avoidance positions corresponding to convex parts disposed on sides of the mobile phone such as buttons, so that the mobile phone can be stably accommodated in the second accommodation chamber 34, and the accuracy of applying the protective film to the mobile phone is improved.

In the illustrated embodiment, the positioning assembly 1 further comprises an adjusting member 16 which is arranged at the inner surface of one side of the inner extension part 118 facing the positioning cavity 111. The adjusting member 16 is an elastic foam for example. Further, the inner surface of the inner extension part 118 defines a mounting slot 38. The adjusting member 16 is mounted in the mounting slot 38 and at least a part of the adjusting member 16 protrudes out of the mounting slot 38.

Referring to FIG. 18, in this embodiment, the frame 11 has a square structure, and the area of the operation window 13 is 60% to 75% of the area of the protective film. Specifically, the inner extension part 118 includes two longitudinal sections 1181 which are disposed on opposite sides of the window 13 in a width/transverse direction of the frame 11, and two lateral sections 1182/1183 which are disposed on the other opposite sides of the window 13 in a length/longitudinal direction of the frame 11. The transverse width of the longitudinal sections 1181 is 6 mm~10 mm. The width of the two longitudinal sections 1181 is greater than 6 mm, which can limit the protective film 21 in the frame 11 and prevent the protective film 21 from being deformed when the release film 22 is detached from the protective film 21. The width of the two longitudinal sections 1181 is less than 10 mm, which can ensure that the visual area of the frame 11 is large enough to allow the user to see the air exhaust process of the major area under the protective film 21 and avoid the situation where the bubbles under the protective film 21 cannot be seen. The adjusting member 16 is disposed on the lower lateral section 1183 opposite to the positioning protrusion 31. Correspondingly, the mounting slot 38 is defined in the lower lateral section 1183, and the width of the lower lateral section 1183 extending toward the operation window 13 is 15 mm~20 mm. In this case, the area of the operation window 13 is set within a reasonable range, which can effectively solve the problems of existing products having an unstable frame due to excessive windows, and can also realize the visualization of the applying film process.

In the illustrated embodiment, as shown in FIG. 18, one end of the frame 11 opposite to the adjusting member 16 defines an opening 14 in communication with the positioning cavity 111. That is, the bottom surface of the opening 14 and the bottom surface of the first accommodation chamber 32 of the positioning cavity 111 are located on the same plane, and the opening 14 runs through the top of the frame 11. A first positioning portion is formed on the bottom surface of the opening 14. The positioning portion can be composed of multiple positioning protrusions distributed at an interval. Correspondingly, the positioning film 12 comprises a second positioning portion 4 corresponding to the opening 14. The positioning portion 4 defines multiple positioning holes corresponding to the positioning protrusions 31. The positioning protrusions 31 are engaged in the positioning holes of the positioning film 12 to thereby position and fix the positioning film 12 and the protective film unit 2 adhered on the positioning film 12 in the first accommodation chamber 32.

As shown in FIG. 1, the connection end 230 of the pull film 23 is secured to the connection part 222 of the release film 22. Specifically, the connection part 222 of the release film 22 extends from one end of the body 221 of the release film 22 and beyond the corresponding end of the protective film 21. The connection end 230 of the pull film 23 can be adhered to the connection part 222 of the release film 22 via the adhesive member 223. The connection end 230 of the pull film 23 and the connection part 222 of the release film 22 are accommodated in the opening 14, as shown in FIG. 6. The end of the frame 11 adjacent to the adjustment member 16 defines a through slot 15 in communication with the first accommodation chamber 32 such that the free end 232 of the pull film 23 and the end of the release film 22 can pass through the through slot 15. When the protective film unit 2 is placed in the first accommodation chamber 32, the free end 232 of the pull film 23 passes through the through slot 15 of the frame 11 to arrive outside of the frame 11 such than a user can pull it.

In the illustrated embodiment, the outer surfaces of the longitudinal sections of the sidewall of frame 11 are provided with anti-slip structure such as anti-slip ribs, in order to increase the friction force between the user's fingers and the frame 11 and prevent the frame 11 from skipping off the user's fingers.

Optionally, the frame 11 defines multiple voids in order to reduce the weight of the frame 11. For example, the voids are arranged at four corners of the frame 11 respectively.

The process of applying the protective film by using the film application of the present invention is introduced as follows:

First, place the frame 11 over the mobile phone so that the mobile phone is accommodated in the second accommodation chamber 34 of the frame 11 and the display screen of the mobile phone faces upwards. A gap is formed between the display screen of the mobile phone and the protective film unit. At this time, the adjusting member 16 applies a preload force on the bottom end of the protective film unit to make the bottom end of the protective film unit abut against the display screen of the mobile phone. Fix the frame 11 on a platform, pull the pull film 23 outwards and slightly upwards to move the release film 22 away from the protective film 21. At this time, the pull film 23 presses the adjusting member 16 upwards to make the adjusting member 16 shrink upwards to relieve the preload force on the protective film unit 2. After the release film 22 is torn off, the adjusting member 16 quickly restores to its original shape and extends downwards to make the protective film immediately contact the display screen of the mobile phone, and exhausts air between the protective film 21 and the display screen of the mobile phone from the end close to the adjusting member 16 to the opposite end away from the adjusting member 16. Thus, the protective film is attached to the display screen of the mobile phone.

During the process of applying the protective film to the display screen of the mobile phone mentioned above, the use of the adjusting member 16 can prevent the pull film 23 from being squeezed when the release film 22 is being pulled away from the protective film 21, thereby preventing the pull film 23 from getting stuck. After the release film 22 is removed from the protective film 21, the adjusting member 16 is capable of driving the protective film 21 to contact the display screen of the mobile phone immediately, thereby automatic exhausting air between the protective film 21 and the display screen of the mobile phone from the end close to the adjusting member 16 to the opposite end away from the adjusting member 16. Generation of bubbles between the protective film 21 and the display screen of the mobile phone is avoided.

The contents described above are only preferred embodiments of the present disclosure, but the scope of the present disclosure is not limited to the embodiments. Any ordinarily skilled in the art would make any modifications or replacements to the embodiments in the scope of the present disclosure, and these modifications or replacements should be included in the scope of the present disclosure. Thus, the scope of the present disclosure should be subjected to the claims.

What is claimed is:

1. A film applicator comprising:
   a frame comprising a positioning cavity for positioning an electronic device therein;
   a positioning film attached to the frame; and
   a protective film unit adhered to a side of the positioning film facing the electronic device, the protective film unit comprising:
   a protective film adhered to the positioning film;
   a release film adhered to a side of the protective film opposite to the positioning film; and
   a pull film fixed to one end of the release film such that the release film can be detached from the protective film by pulling the pull film to allow the protective film to be attached to the electronic device;
   wherein the release film comprises a body adhered to the protective film and a connection part extending from one end of the body, the pull film comprises a connection end connected to the connection part, and an overlapped area between the connection end and the connection part has a width in a range of 3 mm to 20 mm.

2. The film applicator according to claim 1, wherein the frame comprises a first positioning portion located at a side of the positioning cavity;
the positioning film comprises a second positioning portion; and
the positioning film is fixedly or detachably attached to the frame via the first positioning portion cooperating with the second positioning portion.

3. The film applicator according to claim 2, wherein the frame comprises a bottom wall facing the positioning film and a sidewall surrounding the positioning cavity;
the sidewall defines a through slot located at an opposite side of the positioning cavity;
the pull film comprising a free end; and
the free end of the pull film extends out of the frame via the through slot or the pull film is changeable between a use state where the free end of the pull film extends out of the frame via the through slot and a storage state where the free end of the pull film is located within the frame.

4. The film applicator according to claim 3, wherein the free end of the pull film defines a through hole, the sidewall comprises a protrusion projecting into the through slot for engaging in the through hole of the pull film to maintain the free end of the pull film extending out of the frame.

5. The film applicator according to claim 2, wherein the positioning film further comprises a body for supporting the protective film;
the second positioning portion extends from the body and beyond the protective film;
the second positioning portion comprises multiple positioning holes; and
the first positioning portion comprises multiple positioning protrusions engaged in the positioning holes respectively; and
at least one of the positioning holes offsets from another of the positioning holes in a longitudinal direction of the frame and a transverse direction of the frame.

6. The film applicator according to claim 2, wherein an adhesive member is disposed between the first positioning portion and the second positioning portion to thereby adhere the positioning film to the frame.

7. The film applicator according to claim 1, wherein the frame comprises a substrate and a cover pivotably connected to the substrate, the positioning cavity is defined in the substrate, and the positioning film is connected to the substrate or the cover.

8. The film applicator according to claim 7, wherein the cover defines an operation window to expose the positioning film out of the cover.

9. The film applicator according to claim 8, wherein the frame further comprises a through slot which is located at an end of the frame opposite to a pivot joint between the cover and the substrate.

10. The film applicator according to claim 1, wherein the frame comprises a bottom wall facing the positioning film and a sidewall surrounding the positioning cavity, and an operation window is defined at the bottom wall to expose the positioning film which is received in the positioning cavity.

11. The film applicator according to claim 10, wherein the positioning cavity comprises a first accommodation chamber for accommodating the positioning film and the protective film unit, and a second accommodation chamber for accommodating the electronic device; and
the first accommodation chamber is located between the second accommodation chamber and the operation window, and is in communication with the second accommodation chamber and the operation window.

12. The film applicator according to claim 10, wherein the sidewall comprises a recessed portion sunken outwardly from an inner circumferential surface thereof facing the positioning cavity; or
the sidewall comprises a flexible press button facing the positioning cavity.

13. The film applicator according to claim 1, wherein the pull film comprising a free end extending beyond the protective film; and
the free end comprises a through hole or a pull indication sign.

14. The film applicator according to claim 13, wherein
the frame further comprises an operation window, the operation window being located between opposite ends of the frame in a longitudinal direction of the frame;
the positioning film is attached to an inner side of the frame, opposite ends of the positioning film extending beyond opposite ends of the operation window in the longitudinal direction of the frame.

15. The film applicator according to claim 1, wherein a retaining member is provided on a sidewall of the positioning cavity and faces the positioning cavity.

16. The film applicator according to claim 15, wherein the retaining member comprises a deformable boss protruding from the sidewall of the positioning cavity; or
the retaining member comprises an elastic structure fixedly or detachably attached to the sidewall of the positioning cavity.

17. The film applicator according to claim 1, wherein an adhesive layer is disposed between the protective film and the release film, and an adhesive force formed between the adhesive layer and the protective film is greater than another adhesive force formed between the adhesive layer and the release film.

18. The film applicator according to claim 1, wherein the frame comprises a weight reduce structure which comprises any one or more of cutout, notch, opening, aperture, hole and avoid.

19. A film applicator comprising:
a frame comprising a positioning cavity for positioning an electronic device therein;
a positioning film attached to the frame; and
a protective film unit adhered to a side of the positioning film facing the electronic device, the protective film unit comprising:
a protective film adhered to the positioning film;
a release film adhered to a side of the protective film opposite to the positioning film; and
a pull film fixed to one end of the release film such that the release film can be detached from the protective film by pulling the pull film to allow the protective film to be attached to the electronic device;
wherein the frame comprises a first positioning portion located at a side of the positioning cavity, the positioning film comprises a second positioning portion; and
the positioning film is fixedly or detachably attached to the frame via the first positioning portion cooperating with the second positioning portion;
wherein the first positioning portion comprises a first positioning protrusion having a barb or hook formed at a side thereof facing the positioning cavity;
the second positioning portion comprises a first positioning hole; and the first positioning protrusion extends through the first positioning hole with an edge of the first positioning hole being blocked by the barb or hook to prevent the positioning film disengaging from the frame.

20. A film applicator comprising:
a frame comprising a cavity for accommodating an electronic device therein;
a positioning film attached to the frame; and
a protective film unit adhered to a side of the positioning film facing the electronic device, the protective film unit comprising:
  a protective film adhered to the positioning film;
  a release film adhered to a side of the protective film opposite to the positioning film; and
  a pull film fixed to one end of the release film such that the release film can be detached from the protective film by pulling the pull film to allow the protective film to be attached to the electronic device;
wherein the frame comprises a first positioning portion located at a side of the cavity, the positioning film comprises a second positioning portion; and the positioning film is fixedly or detachably attached to the frame via the first positioning portion cooperating with the second positioning portion;
the frame comprises a bottom wall facing the positioning film and a sidewall surrounding the cavity, the sidewall defines a through slot located at an opposite side of the cavity, the pull film comprises a free end;
the free end of the pull film extends out of the frame via the through slot or the pull film is changeable between a use state where the free end of the pull film extends out of the frame via the through slot and a storage state where the free end of the pull film is located within the frame; and
wherein the frame further comprises an adjusting member disposed between the bottom wall and the positioning film and configured for urging the positioning film and the protective film unit toward the electronic device;
the adjusting member protrudes from one of the bottom wall and the positioning film toward the other of the bottom wall and the positioning film;
the first positioning portion and the through slot are respectively arranged at opposite ends of the frame in the longitudinal direction; and
a distance between the adjusting member and an end of the protective film close to the through slot in the longitudinal direction is equal to or less than that between the adjusting member and an opposite end of the protective film close to the first positioning portion.

* * * * *